United States Patent
Isoyama et al.

(10) Patent No.: US 10,416,832 B2
(45) Date of Patent: Sep. 17, 2019

(54) DISPLAY DEVICE, DISPLAY METHOD, AND RECORDING MEDIUM HAVING DISPLAY PROGRAM STORED THEREON

(71) Applicant: NEC Corporation, Minato-ku, Tokyo (JP)

(72) Inventors: Kazuhiko Isoyama, Tokyo (JP); Etsuko Ichihara, Tokyo (JP); Junpei Kamimura, Tokyo (JP); Yoshiaki Sakae, Tokyo (JP); Yuji Kobayashi, Tokyo (JP); Takashi Nomura, Tokyo (JP); Koji Kida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 15/508,546

(22) PCT Filed: Sep. 7, 2015

(86) PCT No.: PCT/JP2015/004524
§ 371 (c)(1),
(2) Date: Mar. 3, 2017

(87) PCT Pub. No.: WO2016/038870
PCT Pub. Date: Mar. 17, 2016

(65) Prior Publication Data
US 2017/0255305 A1    Sep. 7, 2017

(30) Foreign Application Priority Data
Sep. 10, 2014    (JP) .................................. 2014-183807

(51) Int. Cl.
*G06F 3/048*    (2013.01)
*G06F 13/00*    (2006.01)
(Continued)

(52) U.S. Cl.
CPC .......... *G06F 3/048* (2013.01); *G06F 11/3055* (2013.01); *G06F 11/32* (2013.01);
(Continued)

(58) Field of Classification Search
CPC .............................. G06F 3/0481; H04L 41/22
(Continued)

(56) References Cited

U.S. PATENT DOCUMENTS

| 6,041,349 A | 3/2000 | Sugauchi et al. |
| 7,046,248 B1 * | 5/2006 | Perttunen .............. G06F 3/0481 |
| | | 345/440 |

(Continued)

FOREIGN PATENT DOCUMENTS

| JP | H09-237240 A | 9/1997 |
| JP | H11-045197 A | 2/1999 |

(Continued)

OTHER PUBLICATIONS

Japanese Office Action for JP Application No. 2014-183807 dated Nov. 10, 2015 with English Translation.

(Continued)

*Primary Examiner* — Cao H Nguyen

(57) ABSTRACT

Disclosed are a display device, etc. which display information in a display format that provides high visibility. The display device 201 comprises a display unit 202 which displays first nodes, each representing a different communication entity with communication capabilities, or second nodes, each representing a different group of a plurality of communication entities, around a first region, and which shows communications being carried out between first and second nodes, between a plurality of first nodes, or between a plurality of second nodes, in a display format in which the connections between these communicating nodes are indicated within the first region.

9 Claims, 29 Drawing Sheets

(51) Int. Cl.
*G06F 13/10* (2006.01)
*G06F 11/30* (2006.01)
*G06F 11/32* (2006.01)

(52) U.S. Cl.
CPC ............ *G06F 11/324* (2013.01); *G06F 13/00* (2013.01); *G06F 13/10* (2013.01)

(58) Field of Classification Search
USPC ......... 714/773, 734, 776; 715/773, 734, 776
See application file for complete search history.

(56) References Cited

U.S. PATENT DOCUMENTS

| | | |
|---|---|---|
| 2002/0135610 A1 | 9/2002 | Ootani et al. |
| 2006/0164999 A1 | 7/2006 | Yamamoto et al. |
| 2014/0297828 A1* | 10/2014 | Voltmer .................. H04L 41/50 709/223 |

FOREIGN PATENT DOCUMENTS

| | | |
|---|---|---|
| JP | 2001-134544 A | 5/2001 |
| JP | 2002-288229 A | 10/2002 |
| JP | 2004-013475 A | 1/2004 |
| JP | 2006-211173 A | 8/2006 |
| JP | 2006-222790 A | 8/2006 |
| JP | 2012-238237 A | 12/2012 |
| WO | 2011/104983 A1 | 9/2011 |

OTHER PUBLICATIONS

International Search Report for PCT Application No. PCT/JP2015/004524, dated Nov. 17, 2015.

English translation of Written opinion for PCT Application No. PCT/JP2015/004524.

* cited by examiner

Fig. 3

| GROUP | ADDRESS |
|---|---|
| A | 10.56.52.* |
| B | 10.56.53.* |
| C | 10.56.54.* |
| D | 10.56.55.* |

Fig. 4

| IDENTIFIER | STATE |
|---|---|
| 10.56.53.1 | NORMAL |
| 10.56.53.2 | NORMAL |
| 10.56.53.3 | ABNORMAL |
| 10.56.53.4 | ABNORMAL |
| 10.56.53.5 | NORMAL |
| 10.56.53.6 | NORMAL |
| 10.56.54.7 | ABNORMAL |
| 10.56.53.8 | ABNORMAL |
| ... | ... |

| ADDRESS | TIMING | MAGNITUDE OF INFORMATION | COMMUNICATION DESTINATION ADDRESS | ... |
|---|---|---|---|---|
| 10.56.53.1 | T1 | S1 | 10.56.53.2 | ... |
| 10.56.54.3 | T2 | S2 | 10.56.54.4 | ... |
| 10.56.53.7 | T3 | S3 | 10.56.53.8 | ... |
| ... | ... | ... | ... | ... |

DISPLAY DEVICE, DISPLAY METHOD, AND RECORDING MEDIUM HAVING DISPLAY PROGRAM STORED THEREON

This application is a National Stage Entry of PCT/JP2015/004524 filed on Sep. 7, 2015, which claims priority from Japanese Patent Application 2014-183807 filed on Sep. 10, 2014, the contents of all of which are incorporated herein by reference, in their entirety.

TECHNICAL FIELD

The present invention relates to, for example, a display control for controlling display contents to be displayed for communication.

BACKGROUND ART

By monitoring a communication executed among a plurality of information processing devices in a computer system including a personal computer (PC), a server device, and the like, an abnormality and the like exemplified below can be found.

An abnormality occurring in a computer system,
An unauthorized deed to a computer system, and
An attack to a computer system.

A communication is not necessarily a communication executed between a plurality of information processing devices, and may be, for example, a communication executed by processes inside an information processing device.

Hereinafter, in the present application, for convenience of explanation, the above-described abnormality, unauthorized deed, attack, and the like are referred to as "abnormality".

PTL 1 or PTL 2 discloses a monitoring device which monitors an operation state relating to an information processing device in an information processing system. In addition, PTL 3 to 6 discloses a display device or the like capable of displaying a state relating to an information processing system. Hereinafter, each of the devices disclosed in PTL 1 to 6 will be described.

PTL 1 discloses a failure information display device that displays operating conditions of devices to be monitored (hereinafter, referred to as "target device"). The failure information display device includes an operation monitoring unit and a monitoring screen unit. The operation monitoring unit acquires each of operating conditions of a plurality of target devices, and transmits the acquired information to the monitoring screen unit. The monitoring screen unit receives the information and displays the received information on a display unit. In this case, the monitoring screen unit adjusts the number of pixels of the indicator representing the target device, based on the number of pixels of the display unit and the number of target devices.

PTL 2 discloses a monitoring state display device which displays an index representing a target device in a display region. The monitoring state display device includes usage index number determination means, monitoring target allocation means, and display control means. The usage index number determination means determines the number of indices to be used for displaying a target device having a certain degree of importance, based on a degree of importance of a predetermined target device. Next, the monitoring target allocation means allocates the number of the indices substantially equally to a target device having a certain degree of importance. The display control means displays the target device by the number of allocated indices.

PTL 3 discloses a compression encoding device (or a decoding device) which reduces processing in converting the image size. The compression encoding device has image size conversion means, input size adjustment means, and encoding means. The image size conversion means converts input image so as to match the display size, based on a pattern scan signal designating a display size at the time of displaying and an image aspect ratio at the time of decoding. The input size adjusting means adds partial image to be removed after decoding to an image generated by the image size conversion means to generate an image in which the image size of the input image has been adjusted to the encoded image size. Encoding means encodes an image generated by the image size conversion means, a pattern scan signal and an aspect ratio presentation signal to generate a bit stream signal.

PTL 4 discloses a monitoring program in which the cause thereof can be specified even when a communication abnormality occurs at an application level. The monitoring program has a detection function, a management function, a result display function, and an abnormality display function. The detection function detects whether or not each network device included in a plurality of network devices is operating normally. The result display function displays a detection result by the detection function on a display. The management function receives a notification message transmitted by a computer to be monitored and manages the received notification message when the occurrence frequency of a network device which is not operating normally exceeds a specified value. For each message managed by the management function, the abnormality display function displays information capable of identifying a computer which has issued the message on the display.

PTL 5 discloses a relationship display device capable of displaying a relationship between two elements and displaying a relationship between the two elements and a group including each of the two element. In the relationship display device, a plurality of circular regions each representing elements in a first set are displayed, and a node representing a second set and an arc representing a group in which the second group is classified are further displayed. The relationship display device displays a relationship between first elements included in the first set and second elements included in the second set by using an arc connecting an arc representing a group to which the second element belongs and a circular region. The relationship display device displays a relationship between a first element included in the first set and a group into which the second group is classified by using an arc connecting the circular region and the node.

PTL 6 discloses a hierarchical presentation device capable of displaying a tree structure having a deep hierarchy. The hierarchy presentation device has a set storing means, a tree structure storage means, a node instruction means, a node selection means, a figure generation means, a list generation means, and a presentation means. Element sets are stored in the set storage means. In the tree structure storage means, the tree structure data in which the hierarchical relationship regarding the element set held by the set storage means is expressed using a node and a link are stored. The node instruction means instructs whether or not to display a node included in the tree structure data stored in the tree structure storage means. The node selection means selects a target node to be displayed in detail from the tree structure data. The figure generation means extracts the node instructed to be displayed by the node instruction means and generates a tree structure drawing by using the extracted node. The list generation means generates a list of information elements corresponding to the target node selected by the node selection means. The information presentation means presents information in which the tree structure drawing and the list generated by the list generation means are associated with each other.

CITATION LIST

Patent Literature

PTL 1: Japanese Unexamined Patent Application Publication No. 2012-238237
PTL 2: International Publication No. WO 2011/104983
PTL 3: Japanese Unexamined Patent Application Publication No. 2006-222790
PTL 4: Japanese Unexamined Patent Application Publication No. 2006-211173
PTL 5: Japanese Unexamined Patent Application Publication No. 2004-013475
PTL 6: Japanese Unexamined Patent Application Publication No. H11(1999)-045197

SUMMARY OF INVENTION

Technical Problem

As described above, the devices disclosed in PTLs 1 to 6 can display an operation state of each information processing device in an information processing system. However, the device does not have a function of displaying information on processing (such as communication) performed between a plurality of information processing devices. Even when a display unit displays the information, unless the information is easy to see, it becomes difficult for an administrator managing information processing system to grasp a state of the information processing system merely by looking at information displayed on the display unit.

Accordingly, a main object of the present invention is to provide a display device or the like for displaying information according to a display mode having a high visibility.

Solution to Problem

In order to achieve the aforementioned object, as an aspect of the present invention, a display device including:
display means for displaying a first node representing a communication body capable of communicating or a second node representing a plurality of communication bodies around the first region, and for displaying communication executed either between the first node and the second node, between the plurality of first nodes, or between the plurality of second nodes inside the first region with a display mode connecting the plurality of nodes.

In addition, as another aspect of the present invention, a display method including:
displaying a first node representing a communication body capable of communicating or a second node representing a plurality of communication bodies around the first region, and displaying communication executed either between the first node and the second node, between the plurality of first nodes, or between the plurality of second nodes inside the first region with a display mode connecting the plurality of nodes.

Furthermore, the object is also realized by an associated display program, and a computer-readable recording medium which records the program.

Advantageous Effects of Invention

According to the display device or the like of the present invention, it is possible to display information in accordance with a display mode having a high visibility.

BRIEF DESCRIPTION OF DRAWINGS

FIG. 3 is a diagram conceptually illustrating one example of group information.
FIG. 4 is a diagram conceptually illustrating one example of communication body information.
FIG. 12 is a diagram conceptually illustrating an example of abnormality information.
FIG. 16 is a diagram conceptually illustrating an example of monitoring information.

DESCRIPTION OF EMBODIMENTS

Next, example embodiments of the present invention will now be described in detail with reference to the drawings.

First Example Embodiment

Figure 1:
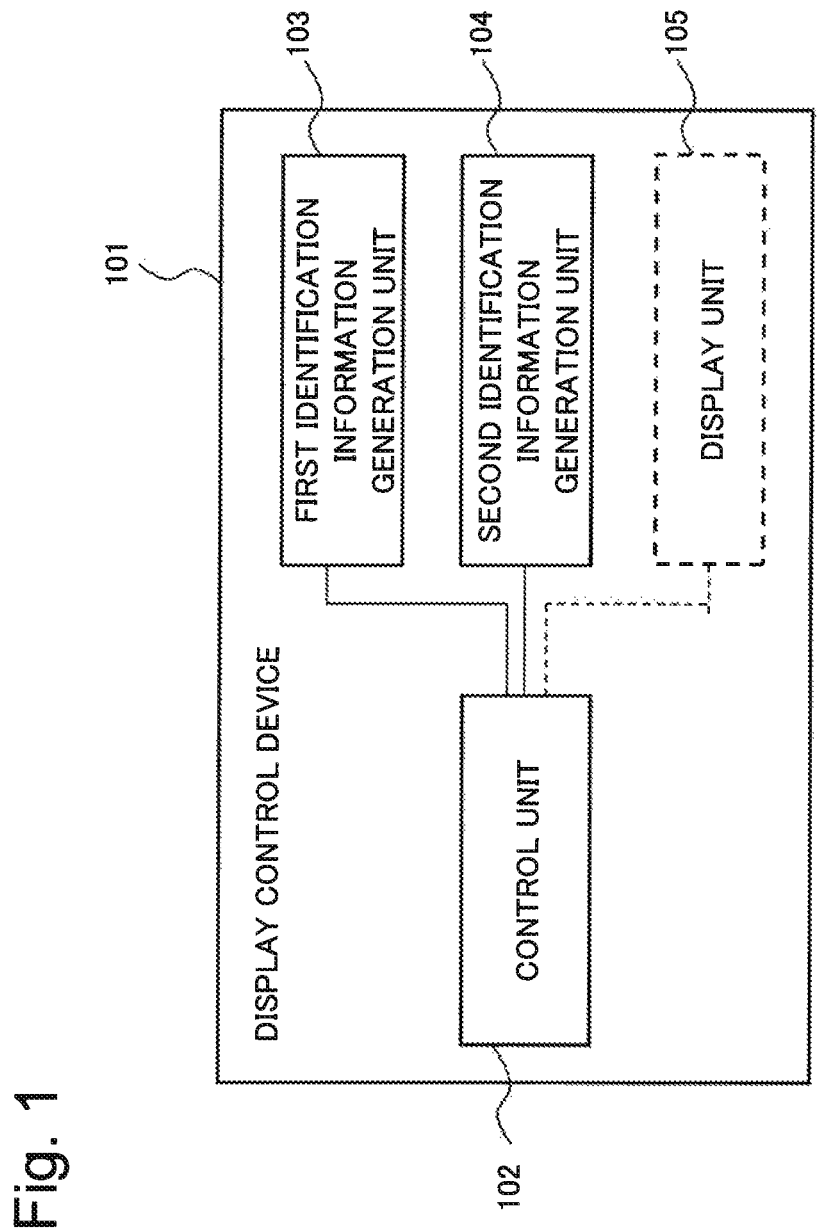
FIG. 1 is a block diagram illustrating the configuration of the display control device according to a first example embodiment of the present invention.

The configuration of a display control device 101 according to a first example embodiment of the present invention and a processing performed by the display control device 101 will be described in detail with reference to FIG. 1. FIG. 1 is a block diagram illustrating the configuration of the display control device 101 according to the first example embodiment of the present invention.

The display control device 101 according to the first example embodiment includes a control unit 102, a first identification information generation unit 103, and a second identification information generation unit 104. Further, the display control device 101 may include a display unit 105.

Next, a processing in the display control device 101 will be described with reference to examples illustrated in FIG. 3 and FIG. 4. FIG. 3 is a diagram conceptually illustrating one example of group information. FIG. 4 is a diagram conceptually illustrating one example of communication body information.

Communication bodies are, for example, an information processing device, a cellular phone, a communication device, or the like which can communicate via a communication network. Further, communication bodies may be a file, a process, a socket, a pipe, or the like in the information processing device. For example, when information is mutually transmitted and received among a plurality of processes in accordance with a program described in a file, it can be considered that the plurality of processes execute communication. Like a process, it can be considered that a file, a socket, and a pipe execute communication.

For convenience of explanation, it is assumed that communication bodies are an information processing device that can be uniquely identified by using an Internet protocol (IP) address (hereinafter, referred to as "address"). In other words, it is assumed that a uniquely identifiable identifier is assigned to each of communication bodies. It is assumed that an information processing system including the communication bodies is, for example, an information processing system for a communication network constructed by using a local area network (LAN) in a certain company. It is assumed that the communication network is divided into subnetworks (hereinafter, referred to as "subnets") for respective organizations (groups) in the certain company.

In the communication body information illustrated in FIG. 4, an identifier (address) representing a communication body and a state indicating whether communication performed by the communication body is normal or abnormal are associated with each other. In the example illustrated in FIG. 4, an identifier "10.56.53.1" is associated with a state "normal". This indicates that communication executed by the communication body represented by the identifier "10.56.53.1" is normal. For example, an identifier "10.56.53.3" is associated with a state "abnormal". This indicates that communication executed by the communication body represented by the identifier "10.56.53.3" is abnormal.

Further, in the group information, an address indicating a plurality of communication bodies and a group including the plurality of communication bodies are associated with each other. In the example shown in FIG. 3, a plurality of addresses "10.56.52.*" are associated with group "A". A plurality of addresses "10.56.52.*" are communication bodies represented by addresses whose identifier of the communication bodies starts with "10.56.52" such as a communication object represented by an identifier "10.56.52.1" and a communication object represented by an identifier "10.56.52.2". In this case, "*" represents, for example, a plurality of integer values from 0 to 255.

The communication body information and the group information do not have to be in an aspect illustrated in FIG. 3 or FIG. 4. For example, the communication body information may be an aspect in which a communication body associated with a state "normal" and a communication body associated with a state "abnormal" are individually stored. In other words, the communication body information and the group information are not limited to the examples described above.

Figure 2:
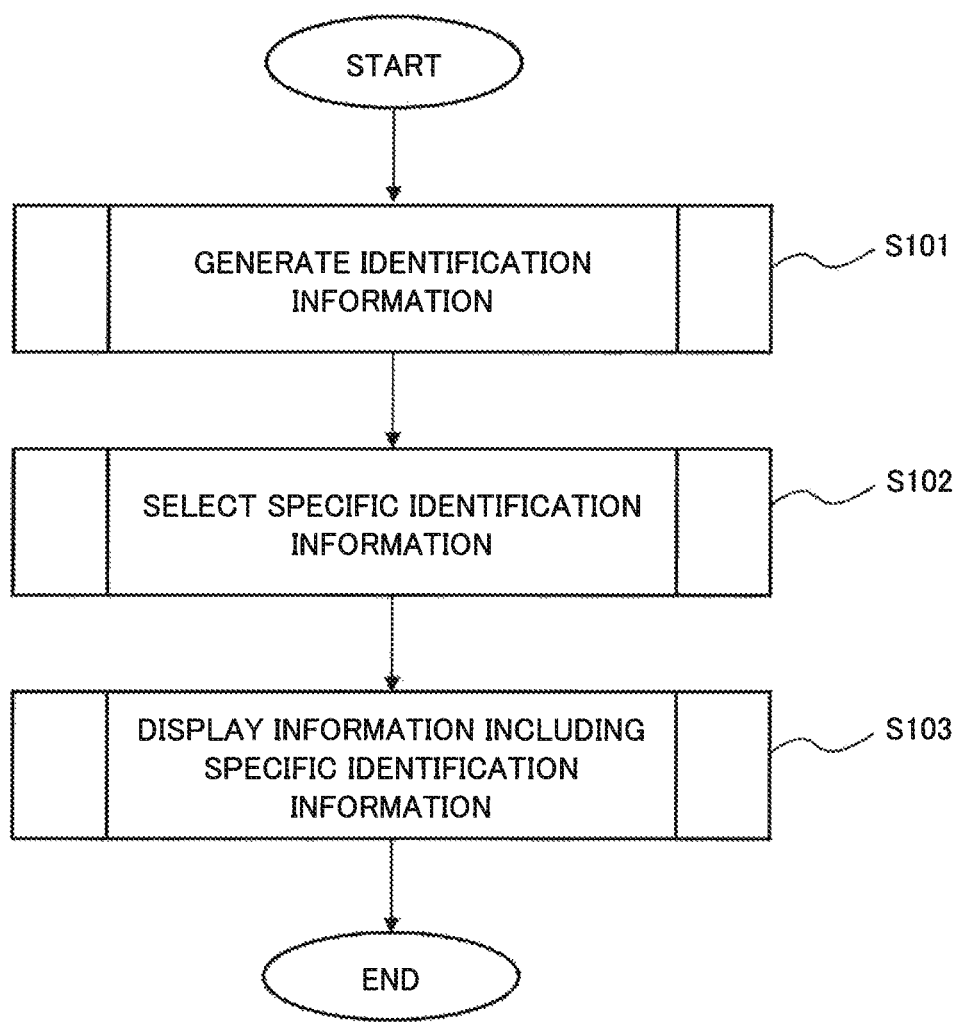
FIG. 2 is a flowchart illustrating a flow of processing in the display control device according to the first example embodiment.

Here, the flow of a processing in the display control device 101 according to the first example embodiment will be described with reference to FIG. 2. FIG. 2 is a flowchart illustrating the flow of the processing in the display control device 101 according to the first example embodiment.

Step S101:

First, a first identification information generation unit 103 and a second identification information generation unit 104 generate identification information for identification information representing communication bodies (step S101). Hereinafter, step S101 will be described.

For convenience of explanation, it is assumed that communication bodies are classified into a plurality of groups like the group information illustrated in FIG. 3.

Based on the group information, the first identification information generation unit 103 generates identification information representing some communication bodies or all communication bodies included in one group. The first identification information generation unit 103 executes a process of generating the identification information for one or more groups. When generating identification information representing some communication bodies included in one group, the first identification information generation unit 103 generates, based on the communication body information representing some communication bodies, identification information which can identify some of the communication bodies is generated.

For example, the first identification information generation unit 103 reads the address associated with a state "normal" from the communication body information illustrated in FIG. 4. For example, the first identification information generation unit 103 generates identification information representing one or more addresses adjacent to each other among the read addresses.

Figure 5:
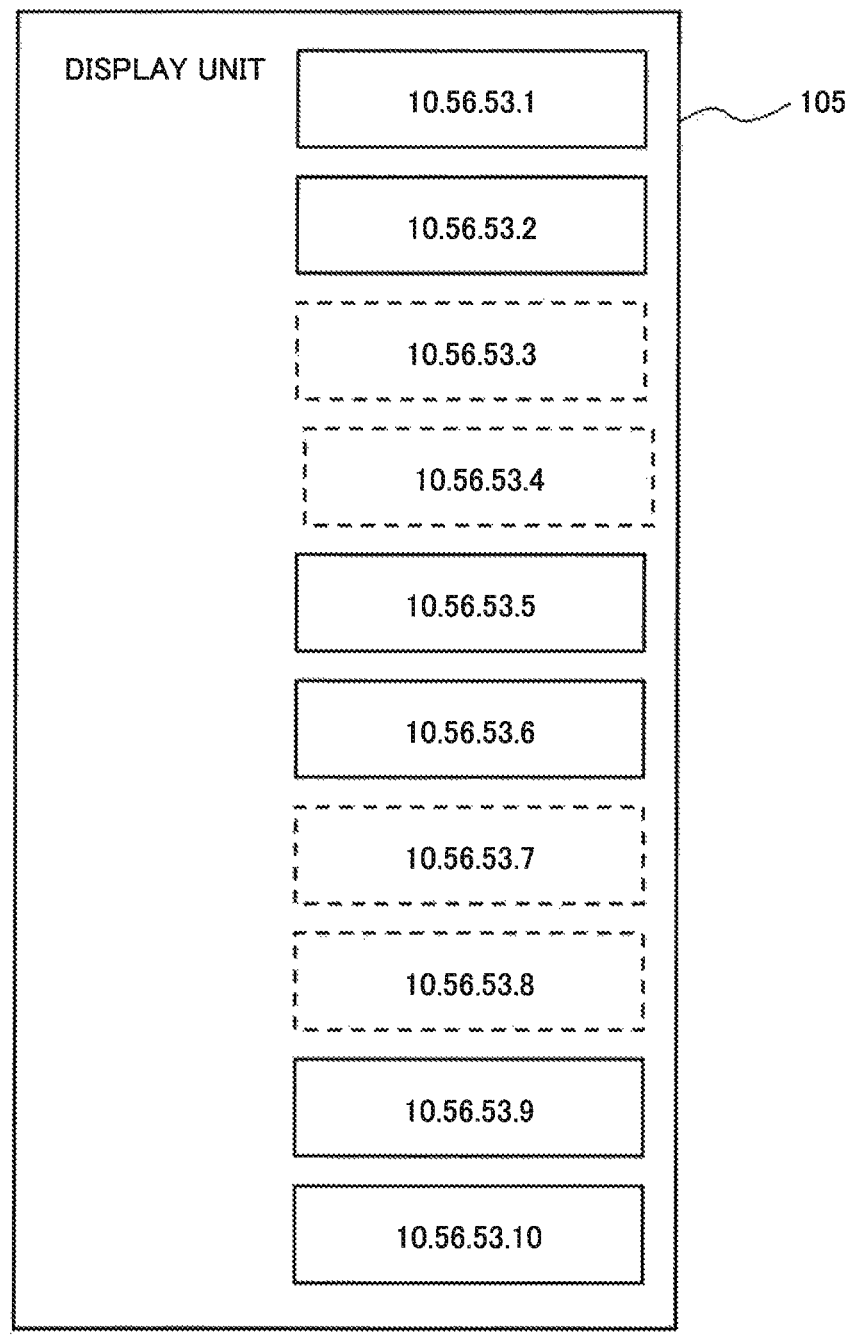
FIG. 5 is a diagram illustrating a display unit which displays one example of addresses that can identify communication bodies.

It is assumed that addresses which can identify individual communication bodies as illustrated in FIG. 5 are assigned to communication bodies. FIG. 5 is a diagram illustrating the display unit 105 which displays one example of addresses that can identify communication bodies.

For example, in the example illustrated in FIG. 5, the identification information is an address which can identify a communication body. For convenience of explanation, a format for displaying addresses which can identify communication bodies is expressed as a level 1 display format. In this case, level 1 represents a format for displaying an address (identification information) which can identify each of the communication bodies. The level of the display format is a numerical value representing the degree of detail regarding information to be displayed on the display device (or display unit, not illustrated). For example, as described below, a level with a larger number indicates that the information is displayed in accordance with a display mode (form, format) representing a summary, and a level with a smaller number indicates that the information is displayed in accordance with a display mode displaying in detail. Therefore, the smaller the number of the level is, users can obtain more information on each communication body to be displayed.

In the example illustrated in FIG. 5, a solid-line rectangle attached to the periphery of the communication body indicates that the communication body is associated with a state "normal". A dotted-line rectangle attached to the periphery of the communication body indicates that the communication body is associated with a state "abnormal".

Figure 6:
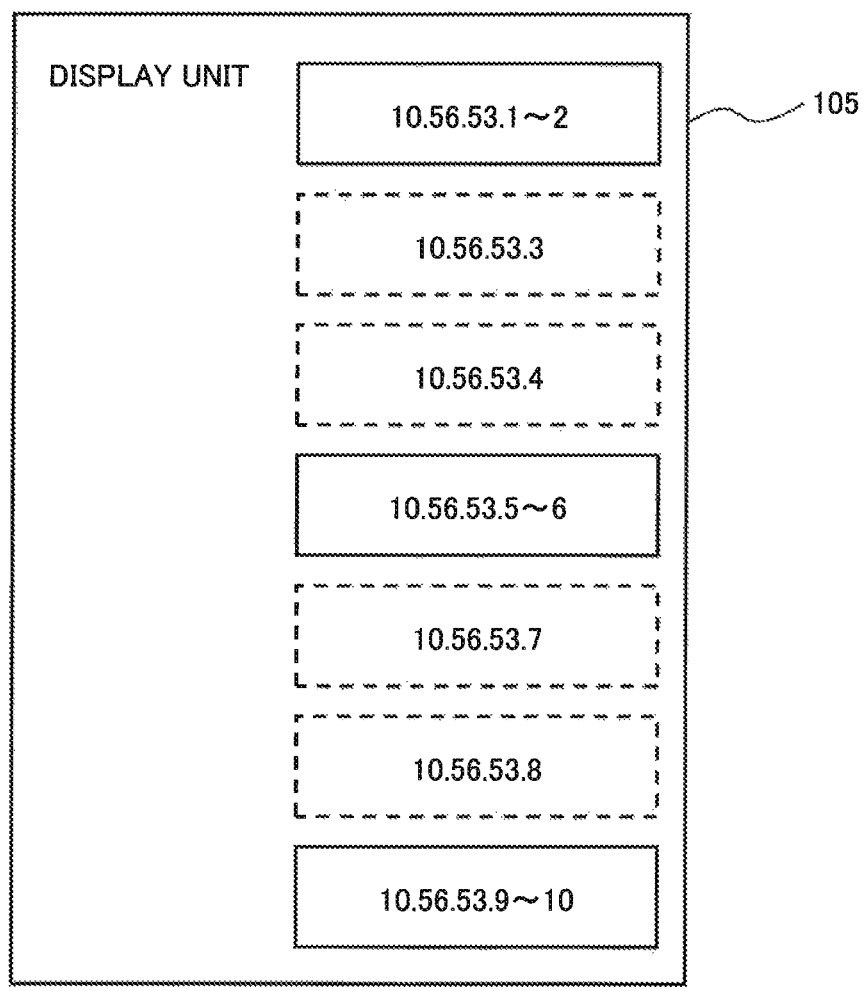
FIG. 6 is a diagram illustrating a display unit which displays one example of identification information.

In the processing illustrated in step S101, the first identification information generation unit 103 generates, for example, identification information representing a plurality of communication bodies as illustrated in FIG. 6 according to communication body information. FIG. 6 is a diagram illustrating the display unit 105 which displays one example of identification information.

In the example illustrated in FIG. 6, the first identification information generation unit 103 generates identification information "10.56.53.1-2" as identification information representing an address "10.56.53.1" and an address"10.56.53.2". In other words, the identification information "10.56.53.1-2" represents the address "10.56.53.1" and the address"10.56.53.2". The first identification information generation unit 103 generates identification information "10.56.53.5-6" as identification information representing an address "10.56.53.5" and an address"10.56.53.6". In other words, the identification information "10.56.53.5-6" represents the address "10.56.53.5" and the address"10.56.53.6".

The first identification information generation unit 103 may generate identification information representing communication bodies included in one group. For example, the first identification information generation unit 103 may generate identification information "10.56.53.1-10" for addresses from "10.56.53.1" to "10.56.53.10".

Hereinafter, when the level of the display format is 2 to 5, the first identification information generation unit 103 generates identification information, and when the level of the display format is 6 or 7, the second identification information generation unit 104 generates identification information, whereby processing is executed with respect to level 2 to level 7. The identifier need not be an address, and may be any information which can identify communication bodies, and further, which is ordered. The identification information need not be an address, and is information associated with one or more communication bodies, and may be any ordered information. Levels 2 to 7 of the display format will be described later with reference to FIGS. 6 to 11.

Based on the group information illustrated in FIG. 3, the second identification information generation unit 104 generates identification information collectively representing two or more groups out of the plurality of groups. Hereinafter, it is assumed that a group set represents two or more groups.

For example, the second identification information generation unit 104 reads an address "10.56.52.*" and an address "10.56.53.*" from group information, and generates identification information "10.56.52-53" representing the two read addresses. It is noted that "*" represents a plurality of integer values such as from 0 to 255.

Step S102:

Next, based on a predetermined size, the control unit 102 selects specific identification information from the identification information generated by the first identification information generating unit 103 and the second identification information generating unit 104 (step S102). It is noted that, when there are a plurality of specific identification information, the number of specific identification information representing one identifier is one.

For example, the predetermined size is the size of a displayable region, or the size of a window (display frame) that is scheduled to be displayed. The size of the displayable region is, for example, the size of a display unit or the size of a partial region on the display unit 105.

For example, the control unit 102 calculates the size of a region needed to display certain identification information and information (identifier) representing communication bodies not included in the certain identification information on the display unit 105 with a predetermined character size. For example, the control unit 102 adds the number of characters included in certain identification information and the number of characters included in information (identifier) representing communication bodies not included in the certain identification information, and multiplies the calculated value by a predetermined character size, thereby calculating the size of the region. In this case, the predetermined character size is, for example, a size that allows users to visually recognize displayed characters.

Next, the control unit 102 compares the size of the calculated region with a predetermined size. For example, when it is determined that the size of the calculated region is equal to or smaller than a predetermined size, the control unit 102 controls to display the identification information and information (identifier) representing communication bodies not included in the certain identification information with a predetermined character size. In other words, when it is determined that the size of the calculated region is equal to or smaller than the predetermined size, the control unit 102 selects the certain identification information as specific identification information representing a target to be displayed on the display unit 105.

Identification information in cases in which the size of the calculated region is equal to or smaller than a predetermined size and the size of the calculated area is the maximum (hereinafter referred to as "optimum case") is information which is easy for users to visually recognize as information to be displayed with a predetermined character size.

For example, the control unit 102 may determine specific identification information by repeating a process of calculating the size of a region based on the number of characters and a process of comparing the magnitude between the calculated size of the region and a predetermined size with respect to the level of a display format to be described later. Through these processes, the control unit 102 determines the level of a display format of the case (optimum) suitable for displaying on the display unit 105, and in accordance with the level, determines specific identification information representing a target to be displayed on the display unit 105 (step S102).

Step S103:

Next, the control unit 102 displays, on the display unit 105, specific identification information and information representing communication bodies not represented using the specific identification information (step S103).

Figure 13:
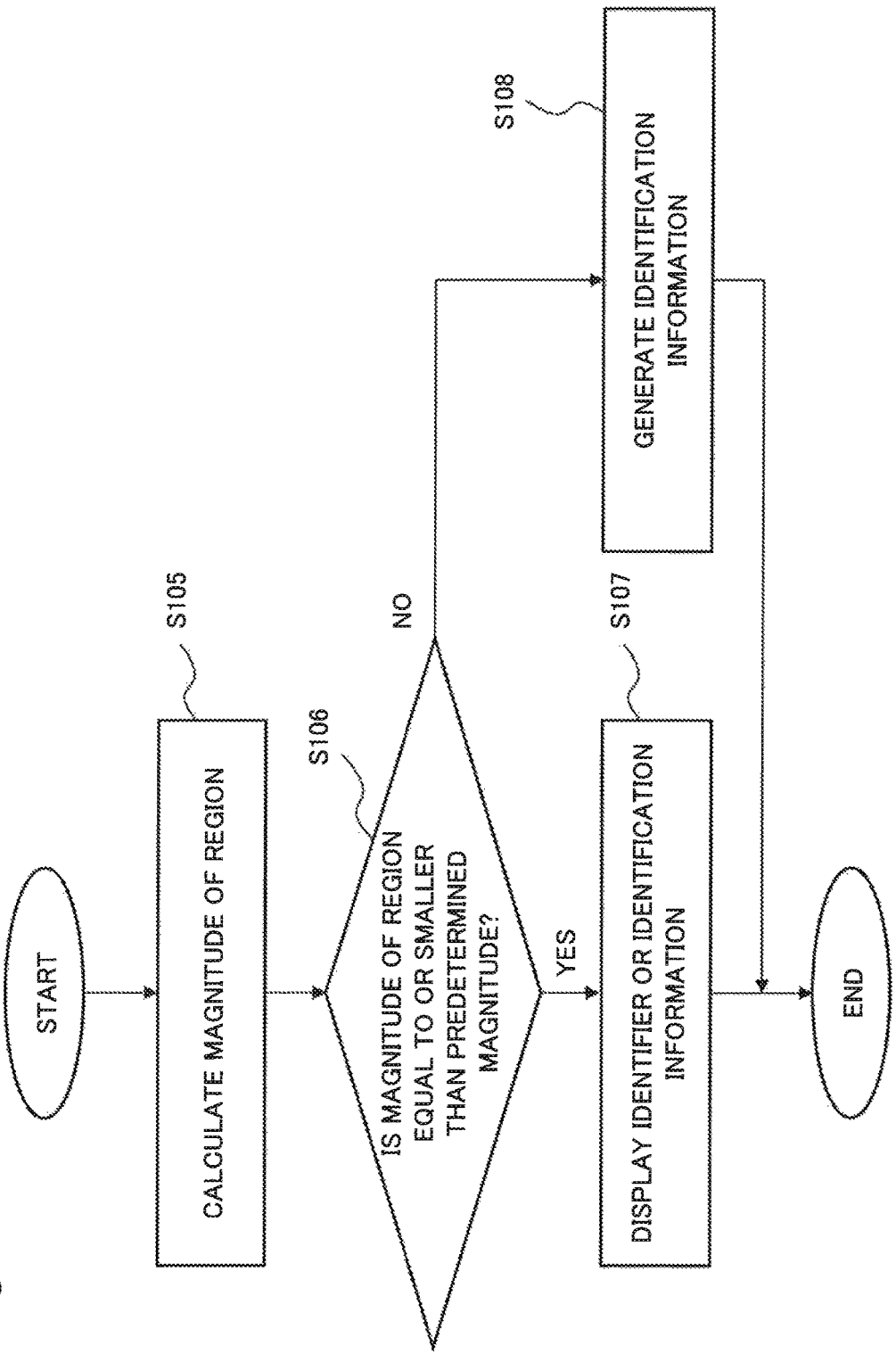
FIG. 13 is a flowchart illustrating one example of processing in a display control device according to the first example embodiment.

The control unit 102 may sequentially search a level related to the display format by repeatedly executing the processing illustrated in FIG. 13 until an appropriate level related to the display format is found. FIG. 13 is a flowchart illustrating one example of processing in the display control device 101 according to the first example embodiment. With reference to FIG. 13, details of processing for realizing the processing illustrated in FIG. 2 will be described.

The control unit 102 calculates the size of a region needed to display information representing communication bodies included in the communication body information on the display unit 105, based on the number of characters or the like included in the identification information, for example (step S105).

Next, when it is determined that the size of the calculated region is equal to or smaller than a predetermined size (YES in step S106), the control unit 102 displays information representing the communication bodies on the display unit 105 (step S107). For example, when the size of the region needed to display level 1 is equal to or smaller than a predetermined size, the control unit 102 displays the identifier illustrated in FIG. 5 on the display unit 105.

On the other hand, when it is determined that the size of the calculated region is larger than the predetermined size (NO in step S106), the control unit 102 generates identification information, for example, by instructing the first identification information generation unit 103 to perform processing (step S108, corresponding to step S101). In this case, for example, the first identification information generation unit 103 generates identification information representing one or more addresses adjacent to each other for communication bodies associated with a state "normal" in communication body information.

Thereafter, when the level of the display format is 2 to 5, the first identification information generation unit 103 generates identification information, and when the level of the display format is 6 or 7, the second identification information generation unit 104 generates identification information, whereby processing is executed with respect to level 2 to level 7.

Next, the control unit 102 calculates the size of a region needed for displaying the identification information generated according to the process illustrated in step S108 and information (identifier) representing communication bodies not included in the generated identification information on the display unit 105 with a predetermined character size (step S105). When it is determined that the size of the calculated region is equal to or smaller than a predetermined size (YES in step S106, corresponding to step S102), the control unit 102 displays the identification information and information representing the communication bodies not represented by using the identification information on the display unit 105 (steps S107, corresponding to step S103).

For example, when the size of a region needed for displaying in the level 1 display format as illustrated in FIG. 5 is larger than a predetermined size, the control unit 102 instructs the first identification information generation unit 103 to perform processing so as to generate identification information representing "10.56.53.1" and "10.56.53.2" illustrated in FIG. 5. In this case, the first identification information generation unit 103 generates identification information "10.56.53.1-2" representing "10.56.53.1" and "10.56.53.2" (step S108). In the case of YES in step S106, the display unit 105 displays information including the identification information "10.56.53.1 to 2" generated by the first identification information generation unit 103, for example, in the display mode illustrated in FIG. 6 (step S107). In the example illustrated in FIG. 6, the display unit 105 displays identification information on communication bodies associated with a state "normal" and further displays an address for communication bodies associated with a state "abnormal". Hereinafter, this display mode is referred to as a level 2 display format. In this case, level 2 represents a display format in which, among identification information included in a certain group, each piece of identification information associated with a state "abnormal" which is a target of interest is displayed, and, with respect to the identification information associated with a state "normal" which is not a target of interest, mutually adjacent pieces of identification information are displayed using one piece of identification information.

Hereinafter, for convenience of explanation, the processes illustrated in step S105 and step S106 are collectively referred to as a "first process".

When it is determined that the size of the calculated region is larger than a predetermined size (NO in step S106), the control unit 102 generates identification information, for example, by instructing the first identification information generation unit 103 to perform processing (step S108). In this case, for example, with respect to communication bodies associated with a state "normal" and communication bodies associated with a state "abnormal" in communication body information, the first identification information generation unit 103 generates identification information representing one or more addresses adjacent to each other, respectively (step S108).

Hereinafter, the processes illustrated in steps S105 and S108 are executed based on the size of a region for displaying information relating to communication on the display unit 105 and the size of a region needed for displaying the information. For example, when the identification information is generated in step S108, the control unit 102 executes the first process representing the processing illustrated in step S105 and step S106.

Figure 7:
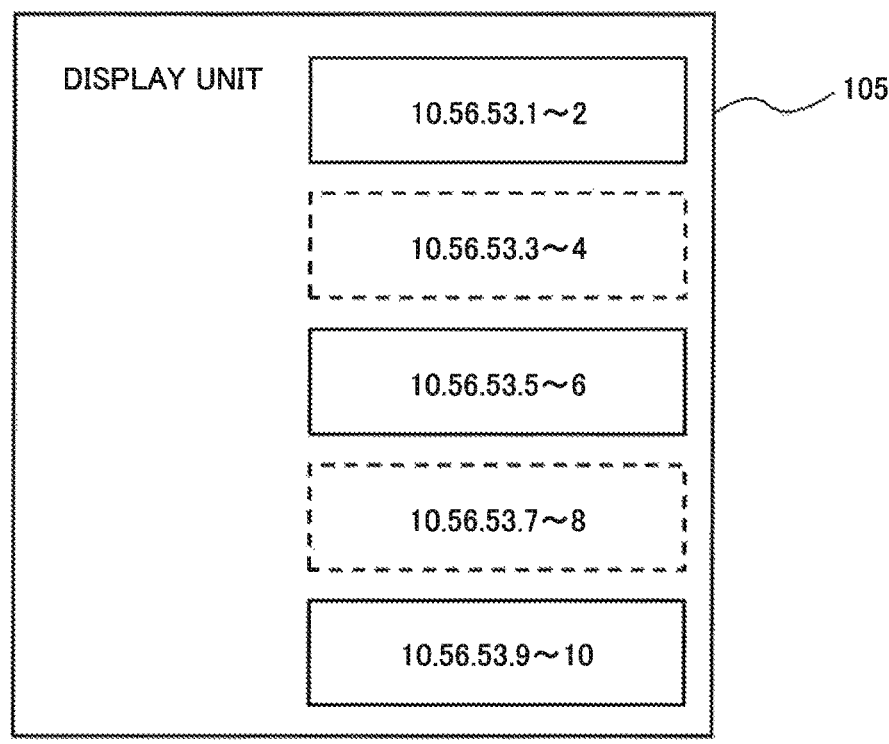
FIG. 7 is a diagram illustrating a display unit which displays an example of an identifier and identification information.

In the case of YES in step S106, the display unit 105 displays, for example, the information illustrated in FIG. 7. FIG. 7 is a diagram illustrating the display unit 105 which displays an example of an identifier and identification information. In the case of the example illustrated in FIG. 7, the display unit 105 displays identification information representing communication bodies associated with a state "normal" and identification information representing communication bodies associated with a state "abnormal". Hereinafter, this display mode is referred to as a level 3 display format. In this case, level 3 represents a display format in which, among identification information included in a certain group, with respect to each of the identification information associated with a state "abnormal" which is a target of interest and the identification information associated with a state "normal" which is not a target of interest, mutually adjacent pieces of identification information are displayed by using one piece of identification information.

When it is determined that the size of the calculated region is larger than a predetermined size (NO in step S106), the control unit 102 generates identification information, for example, by instructing the first identification information generation unit 103 to perform processing (step S108). In this case, for example, with respect to some communication bodies among the communication bodies associated with a certain group in the group information exemplified in FIG. 3, the first identification information generation unit 103 generates identification information representing one or more addresses adjacent to each other.

A specific example of the process in which the first identification information generation unit 103 generates the identification information will be described below. For example, the first identification information generation unit 103 specifies the identification information associated with a state "abnormal" and specifies a region including the specified identification information. For example, the region is a region partitioned by using two pieces of identification information among the identified identification information. In the example illustrated in FIG. 7, for example, the first identification information generation unit 103 specifies the identification information "10.56.53.3" and "10.56.53.8" associated with a state "abnormal" and specifies a region where the identification information ranges from "10.56.53.3" to "10.56.53.8". The first identification information generation unit 103 generates identification information "10.56.53.3-8" as the identification information ranging from "10.56.53.3" to "10.56.53.8".

For example, when the identification information is generated in step S108, the control unit 102 executes the first process representing the processes illustrated in step S105 and step S106.

Figure 8:
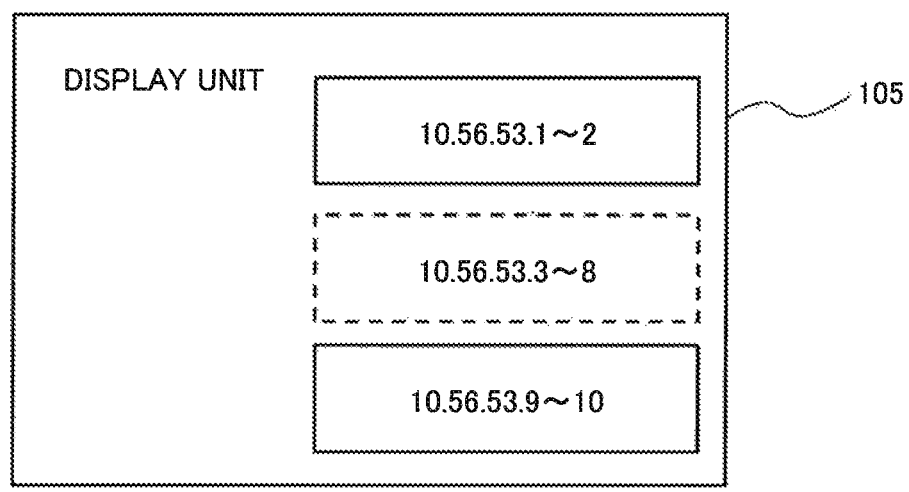
FIG. 8 is a diagram illustrating the display unit which displays an example of an identifier and identification information.

In the case of YES in step S106, the display unit 105 displays, for example, the information illustrated in FIG. 8. FIG. 8 is a diagram illustrating the display unit 105 which displays an example of an identifier and identification information. In the case of the example illustrated in FIG. 8, the display unit 105 displays identification information generated by the processing illustrated in step S101, identification information representing only communication bodies associated with a state "normal", and identification information representing communication bodies including communication bodies associated with a state "abnormal". Hereinafter, this display mode is referred to as a level 4 display format. In this case, level 4 represents a display format for displaying identification information representing the range of addresses bounded by identification information associated with a state "abnormal" as a target of interest and identification information representing a range of addresses not included in the identification information among the identification information included in a certain group.

On the other hand, when it is determined that the size of the calculated region is larger than a predetermined size (NO in step S106), the control unit 102 generates identification information, for example, by instructing the first identification information generation unit 103 to perform processing (step S108). In this case, the first identification information generation unit 103 generates, for example, identification information representing communication bodies associated with a specific group in group information.

For example, when the identification information is generated in step S108, the control unit 102 executes the first process representing the processes illustrated in step S105 and step S106.

Figure 9:
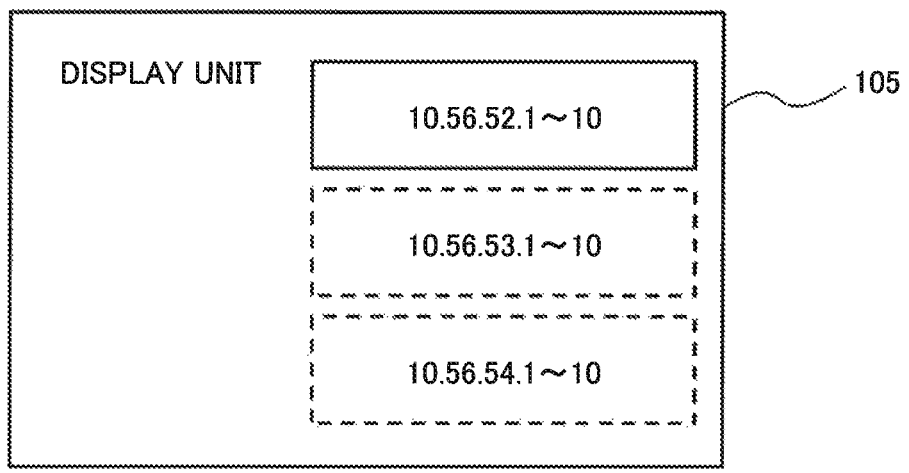
FIG. 9 is a diagram illustrating the display unit which displays an example of an identifier and identification information.

In the case of YES in step S106, the display unit 105 displays, for example, the information illustrated in FIG. 9. FIG. 9 is a diagram illustrating the display unit 105 which displays an example of an identifier and identification information. In the case of the example illustrated in FIG. 9, the display unit 105 displays identification information representing communication bodies associated with the group illustrated in FIG. 3. Hereinafter, this display mode is expressed as a level 5 display format. In this case, level 5 represents, with respect to each group, a display format for displaying identification information included in the group.

On the other hand, when it is determined that the size of the calculated region is larger than a predetermined size (NO in step S106), the control unit 102 generates identification information, for example, by instructing the second identification information generation unit 104 to perform processing (step S108). In this case, for example, in the group information illustrated in FIG. 3, the second identification information generation unit 104 generates identification information representing communication bodies associated with any one of the plurality of groups. For example, the control unit 102 displays the generated identification information by adding a dotted-line rectangle there around when any one of the communication bodies represented by the identification information among the identification information included in one group in the group information is associated with a state "abnormal" in the communication body information illustrated in FIG. 4. On the other hand, for example, when all communication bodies represented by identification information included in one group are associated with a state "normal", the control unit 102 displays the generated identification information on the display unit 105 by adding a solid-line rectangle there around.

For example, when the identification information is generated in step S108, the control unit 102 executes the first process representing the processes illustrated in step S105 and step S106.

Figure 10:
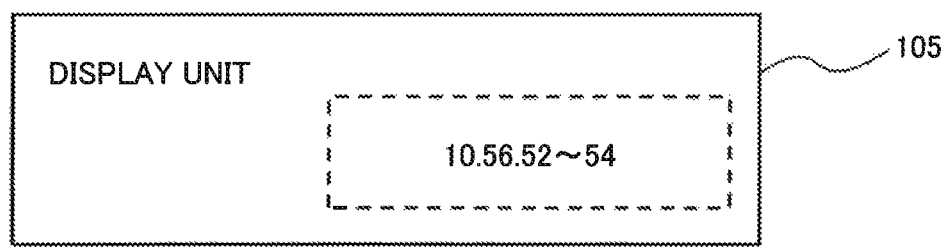
FIG. 10 is a diagram illustrating the display unit which displays an example of an identifier and identification information.

In the case of YES in step S106, the display unit 105 displays, for example, the information illustrated in FIG. 10. FIG. 10 is a diagram illustrating the display unit 105 which displays an example of an identifier and identification information. In the case of the example illustrated in FIG. 10, the display unit 105 displays identification information representing a plurality of groups. Hereinafter, this display mode is expressed as a level 6 display format. In other words, the level 6 display format is, for example, a display mode in which identification information is displayed for each group. For example, when at least one communication body represented by identification information included in a plurality of groups is associated with a state "abnormal" in the communication body information illustrated in FIG. 4, the control unit 102 displays the generated identification information by adding a dotted-line rectangle there around. On the other hand, for example, when all communication bodies represented by identification information included in a plurality of groups are associated with a state "normal", the control unit 102 displays the generated identification information on the display unit 105 by adding a solid-line rectangle there around.

On the other hand, when it is determined that the size of the calculated region is larger than a predetermined size (NO in step S106), for example, the control unit 102 instructs the second identification information generation unit 104 to perform processing, thereby generating identification information (step S108). In this case, for example, the second identification information generation unit 104 generates identification information representing communication bodies associated with a group included in the group information.

For example, when the identification information is generated in step S108, the control unit 102 executes the first process representing the processes illustrated in step S105 and step S106.

Figure 11:
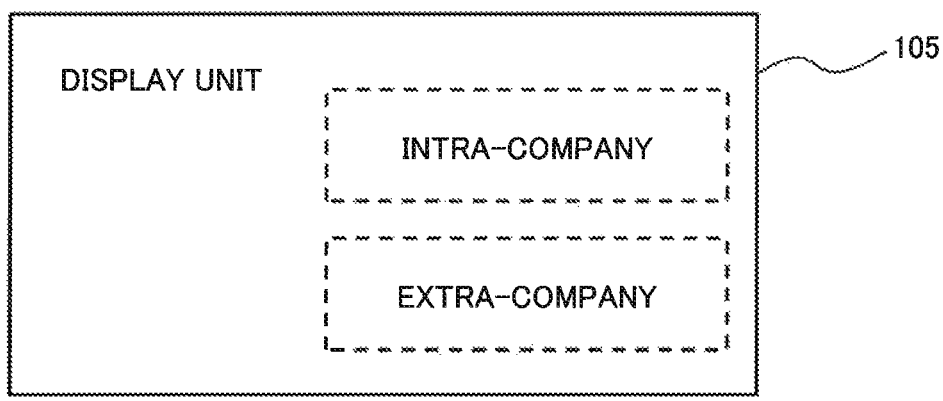
FIG. 11 is a diagram illustrating the display unit which displays an example of an identifier and identification information.

In the case of YES in step S106, the display unit 105 displays, for example, the information illustrated in FIG. 11. FIG. 11 is a diagram illustrating the display unit 105 which displays an example of an identifier and identification information. In the case of the example illustrated in FIG. 11, the display unit 105 displays identification information representing communication bodies associated with a group included in group information. "Intra-company" illustrated in FIG. 11 represents, for example, identification information which can be communicated via an intranet, and "extra-company" represents identification information which can be communicated via the Internet. "Intra-company" represents identification information "10.56.*" including the identification information illustrated in FIG. 10 when communication bodies included in the identification information "10.56.*" is used inside a company. "Extra-company" represents identification information not corresponding to the identification information "10.56.*" when communication bodies included in the identification information "10.56.*" is used inside a company. Hereinafter, this display mode is expressed as a level 7 display format. In other words, the level 7 display format represents, for example, a display format for displaying identification information representing a group included in a certain organization and identification information representing a group not included in the certain organization.

The display mode does not necessarily have to follow the above-described example, and the display format may be such that information (identification information and identifier) to be displayed on the display unit 105 decreases as the level increases.

The control unit 102 may further display information representing a state "normal" or a state "abnormal" based on communication body information with respect to information displayed on the display unit 105. In other words, the control unit 102 may display selected specific identification information and information representing communication bodies not represented by using the specific identification information on the display unit 105 according to a display mode representing a group (step S103).

For example, in the example illustrated in FIG. 5, the control unit 102 displays communication bodies associated with a state "normal" by adding a solid-line rectangle there around. The control unit 102 displays communication bodies associated with a state "abnormal" by adding a dotted-line rectangle there around.

For example, in the example illustrated in FIG. 6, the control unit 102 displays identification information representing communication bodies associated with a state "normal" by adding a solid-line rectangle there around. The control unit 102 displays communication bodies associated with a state "abnormal" by adding a dotted-line rectangle there around.

For example, in the example illustrated in FIG. 7, the control unit 102 displays identification information representing communication bodies associated with a state "normal" by adding a solid-line rectangle there around. Further, the control unit 102 displays identification information representing communication bodies associated with a state "abnormal" by adding a dotted-line rectangle there around.

For example, in the examples illustrated in FIGS. 8 to 11, when any of communication bodies represented by identification information is a communication body associated with a state "abnormal", the control unit 102 displays identification information by adding a dotted-line rectangle there around. In addition, when any of communication bodies represented by identification information are communication bodies associated with a state "normal", the control unit 102 displays identification information by adding a solid-line rectangle there around.

A mode of displaying a state included in communication body information is not limited to a mode in which a rectangle is added there around, and a circle may be added to information to be displayed. In other words, a mode of displaying a state included in communication body information is not limited to the above example, and any display method which can identify a state may be used. In the examples described above, the control unit 102 adds a rectangle to information representing a state "normal" and a state "abnormal", but may be displayed by adding a square to either of them. The control unit 102 may display information in accordance with a display mode using differences in colors depending on groups.

In cases in which "normal" communication bodies are monitored, when any one of the communication bodies represented by identification information is a communication body associated with a state "normal", the control unit 102 may display the identification information by adding a solid-line rectangle there around. Which code should be added to the identification information may be determined in advance according to which state is interested (watched) and monitored. In other words, when display modes related to the values of states are prioritized, the control unit 102 displays the identification information by adding information representing a state having a high priority among the states added to communication bodies represented by the identification information on the basis of the priority ranking.

The control unit 102 searches levels to be sequentially displayed by the processing illustrated in FIG. 13, but it is not always necessary to sequentially search. For example, the control unit 102 starts searching for a level from a level 4 display format, and searches for a level lower than level 4 when it is determined that the size of the calculated region is equal to or smaller than a predetermined size. The control unit 102 may search for a level higher than level 4 when it is determined that the size of the calculated region is larger than a predetermined size. In other words, a method by which the control unit 102 searches for a level is not limited to the above-described method.

Although the display control device 101 reads communication body information, when communication bodies to be displayed is determined, processing may be executed based on the abnormality information illustrated in FIG. 12. FIG. 12 is a diagram conceptually illustrating an example of the abnormality information. In the abnormality information, an address associated with a state "abnormal" is stored.

For example, the display control device 101 reads an address from the abnormality information and generates communication body information (for example, FIG. 4) in which the read address and a state "abnormal" are associated with each other. On the other hand, the display control device 101 generates communication body information in which an address representing a communication body other than a communication body represented by an address that is not stored in the abnormality information and a state "normal" are associated with each other among communication bodies to be displayed.

Hereinafter, the display control device 101 executes processing similar to the processing illustrated in FIG. 2 or the like.

Figure 14:
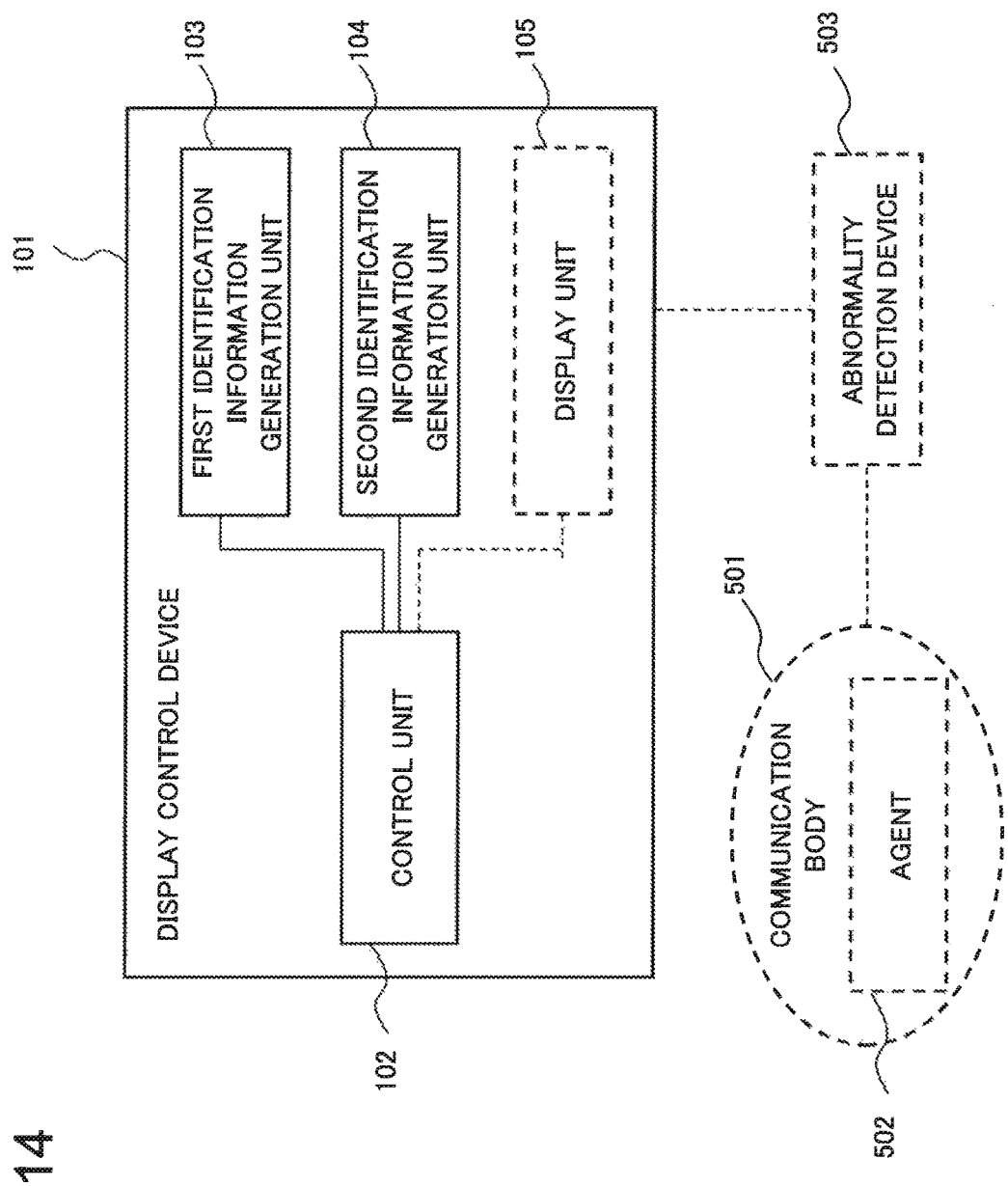
FIG. 14 is a diagram illustrating a configuration including an abnormality detection device which generates abnormality information.
Figure 15:
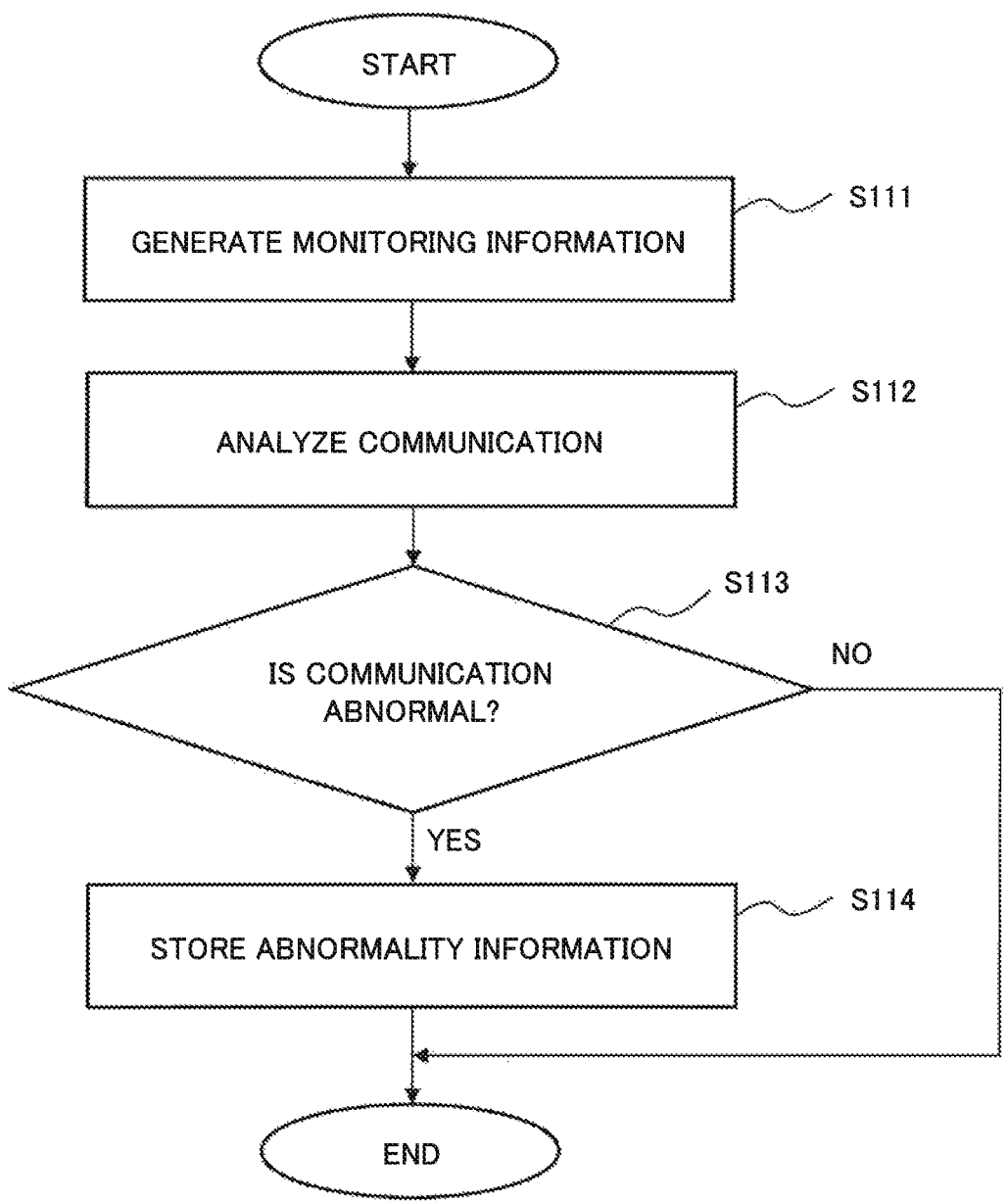
FIG. 15 is a flowchart illustrating processing for generating abnormality information.

Next, with reference to FIG. 14 and FIG. 15, processing in which abnormality information is generated will be described. FIG. 14 is a diagram illustrating a configuration including an abnormality detection device 503 which generates abnormality information. FIG. 15 is a flowchart illustrating processing for generating abnormality information.

The abnormality detection device 503 can transmit and receive monitoring information illustrated in FIG. 16 with an agent 502. FIG. 16 is a diagram conceptually illustrating an example of the monitoring information. As illustrated in FIG. 14, a communication body 501 has the agent 502. The monitoring information will be described below in combination with the description of step S111 illustrated in FIG. 15.

For convenience of explanation, FIG. 14 illustrates only one communication body 501, but a plurality of communication bodies may be used.

The agent 502 monitors communication executed between the communication body 501 and another communication body, and generates the monitoring information illustrated in FIG. 16. The agent 502 may monitor communication executed by the communication body 501 from outside the communication body 501.

For example, the agent 502 acquires information on timing of the communication, the size of information transmitted and received in the communication, an identifier representing a communication destination of the communication, and the like with respect to communication to be executed between the communication body 501 and another communication body. Next, the agent 502 generates monitoring information in which the acquired information and the identifier representing the communication body 501 are associated with each other (step S111).

In other words, in the monitoring information, the timing of the communication, the size of the information transmitted and received in the communication, the identifier representing the communication destination of the communication, or the like are associated with the communication performed by the communication body 501 with another communication body. In the monitoring information illustrated in FIG. 16, the identifier is an address assigned to a communication body. The identifier is not limited to an address as long as it can identify a communication body. The monitoring information is not limited to the monitoring information illustrated in FIG. 16, and may include items different from the above items, and it is not always necessary to include all the above items.

Next, the agent 502 transmits the generated monitoring information to the abnormality detection device 503.

The abnormality detection device 503 receives the monitoring information, and analyzes communication executed in a plurality of communication bodies including the communication body 501 based on the received monitoring information (step S112), thereby determining whether the communication executed by the communication body 501 is abnormal or not (step S113). Regarding the determination procedure, since the method is already known, the explanation thereof will be omitted here. When it is determined that the communication executed by the communication body 501 is abnormal, the abnormality detection device 503 stores an identifier (for example, an address) representing the communication body 501 in abnormality information (step S114).

The abnormality detection device 503 may store an identifier (for example, an address) representing the communication body 501 into normality information (not illustrated) when it is determined that the communication executed by the communication body 501 is not abnormal.

Next, effects of the display control device 101 according to the first example embodiment will be described.

According to the display control device 101, it is possible to display information in accordance with a display mode having a high visibility. The reason for this is that the control unit 102 controls to generate identification information based on a predetermined size.

More specifically, the number of communication bodies included in one group is smaller than the number of communication bodies included in the group set including the one group. The identification information generated by the second identification information generation unit 104 represents more communication bodies than the identification information generated by the first identification information generation unit 103. In an environment in which such a relationship exists, the control unit 102 selects a processing destination for generating identification information based on, for example, a predetermined size for displaying information on communication. For example, the predetermined size is the size of a display, the size of a window (display frame) scheduled to display an image, and the like. The image size is not necessarily equal to or smaller than the size of a display, and may be a virtually set size. The control unit 102 controls to display information including the generated identification information on the display unit 105 based on a predetermined size.

In other words, when the predetermined size is not sufficiently large, the control unit 102 displays identification information collectively representing a plurality of communication bodies on the display unit 105. Therefore, since information with a predetermined character size or more is displayed on the display unit 105, processing that is a cause of deterioration of visibility is not executed.

When the display control device 101 displays information in accordance with a display mode having a color difference with which groups can be identified, users can distinguish a group by referring to information displayed on the display unit 105 and referring to a communication body or identification information representing the communication body. Therefore, the user can easily analyze a group of interest by referring to the display.

On the other hand, according to the devices of PTL 1 and PTL 6, when the number of target devices to be displayed is enormous, it is difficult for users to understand the entire information processing system including the target device at one time. Therefore, since the devices disclosed in these documents cannot enjoy the effect of the above-described display control device 101, users are forced into inconvenience.

Second Example Embodiment

Next, a display device which displays a plurality of communication bodies and information on communication executed between the communication bodies will be described.

For example, a display device described in another example embodiment may display information on the display device according to the present example embodiment.

Figure 17:
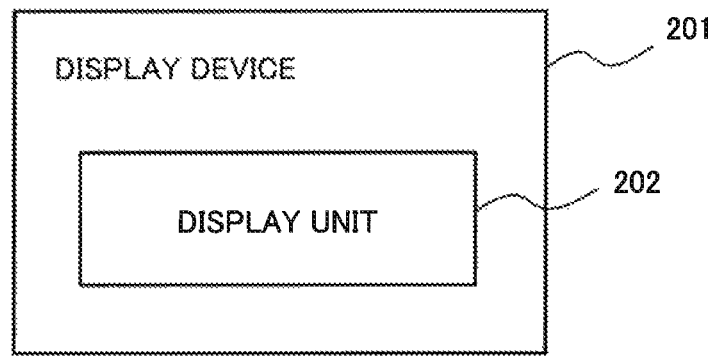
FIG. 17 is a block diagram illustrating a configuration of a display device according to a second example embodiment of the present invention.

The configuration of a display device 201 according to a second example embodiment and the processing executed by the display device 201 will be described with reference to FIG. 17. FIG. 17 is a block diagram illustrating a configuration of the display device 201 according to the second example embodiment of the present invention.

The display device 201 according to the second example embodiment includes a display unit 202.

Figure 18:
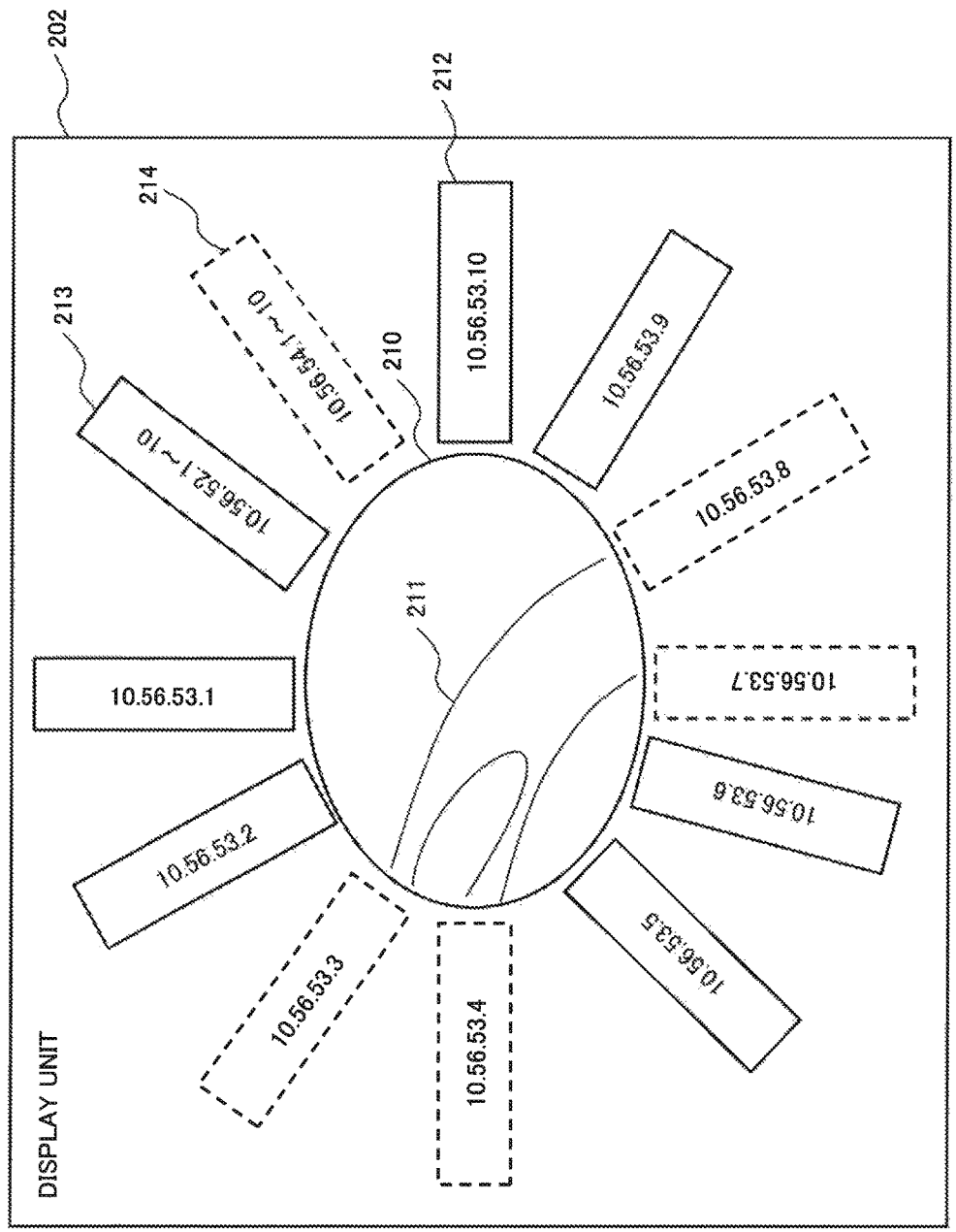
FIG. 18 is a diagram illustrating an example of an image displayed by the display device according to the second example embodiment.

As illustrated in FIG. 18, the display unit 202 displays an identifier (such as an identifier 212) representing a communication body, identification information representing a plurality of communication bodies, or both of them outside a region around (neighborhood, near) a certain region (hereinafter, referred to as "first region 210"). For example, the identification information is identification information 213 or identification information 214. FIG. 18 is a diagram illustrating an example of an image displayed by the display device 201 according to the second example embodiment.

Figure 19:
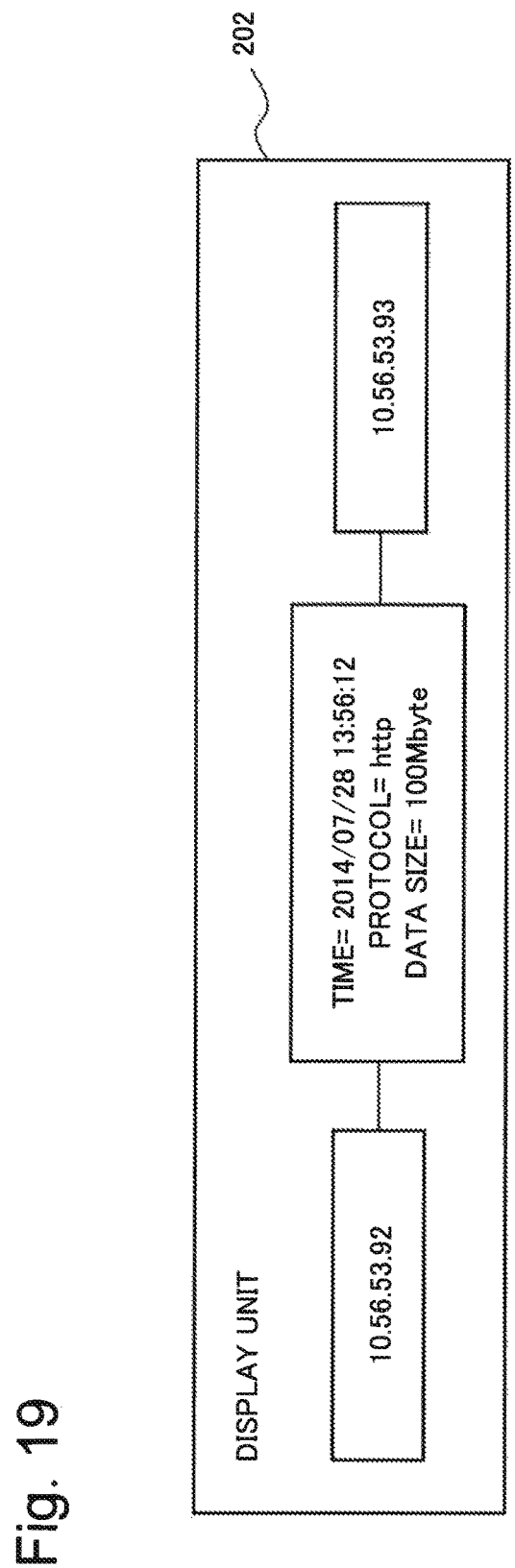
FIG. 19 is a view illustrating one example of displaying in accordance with a mode in which information on communication is superimposed, together with a display mode representing information on communication.

Hereinafter, for convenience of explanation, it is assumed that "node" represents an identifier or identification information. The display unit 202 displays information on communication executed between a plurality of nodes within the first region 210 according to a display mode connecting the plurality of nodes. In the example illustrated in FIG. 18, the display mode is a line 211. In other words, the line 211 represents a communication state executed between a plurality of identifiers, between a plurality of identification information, or between an identifier and identification information. Hereinafter, in the present application, for convenience of explanation, the display mode may be expressed as a line (line 211, line 232 (FIG. 21), line 237 (FIG. 21), or the like). In other words, the first region 210 represents a region in which information on communication executed between a plurality of nodes can be displayed. Further, as illustrated in FIG. 19, the display unit 202 may also display the information on communication, such as an amount of communication transmitted and received in the communication, superimposed on the line 211.

The display unit 202 does not necessarily explicitly display the first region 210. The line 211 need not be connected to the node, and may be displayed to the vicinity of a node to a degree that users can identify, for example. The line 211 need not be a curve, and may be, for example, a straight line or a display mode which can be identified by users In the example shown in FIG. 18, the first region 210 has an elliptical shape or a substantially elliptical shape. For example, the first region 210 may have a convex shape or a substantially convex shape. In the present invention, the convex shape indicates a shape such that a line segment connecting two points included in the convex shape is included in the shape. Further, the first region 210 may have, for example, a circular shape, an elliptical shape, a polygonal shape, or a substantially polygonal shape.

The display unit 202 may display not only information on communication executed between a node and a plurality of nodes but also a state (for example, "normal", "abnormal") for a node. For example, a solid-line rectangle around the identifier 212 indicates that the communication body is a communication body associated with a state "normal". A solid-line rectangle added around the identification information 213 indicates, for example, that communication bodies represented by the identification information 213 are all communication bodies associated with a state "normal". A dotted-line rectangle around the identification information 213 indicates that a communication body represented by the identification information 213 includes a communication body associated with a state "abnormal", for example.

When the display unit 202 displays in three dimensions, the first region 210 may have a three-dimensional shape. The first region 210 may be a spherical shape, a substantially spherical shape, a polyhedral shape, a substantially polyhedral shape, an ellipsoid shape, a substantially ellipsoid shape, a curved body shape having a convex shape, a curved body shape having a substantially convex shape, or the like.

Next, effects of the display device 201 according to the second example embodiment will be described.

According to the display device 201 of the second example embodiment, information can be displayed in accordance with a display mode having a high visibility. This is because the display device 201 displays a plurality of nodes and information on communication executed between the nodes, separately.

More specifically, the display unit 202 displays a node around and outside the first region 210 having, for example, a circular shape, and displays information on communication executed between a plurality of nodes inside the first region 210 as a line 211. Therefore, according to the display unit 202, it is possible to display a plurality of nodes and information on communication executed between the nodes so as not to overlap each other. This effect is not limited to cases in which the first region 210 is a circular shape, and such an effect is similar even when the first region is a polygon, a convex shape or a substantially convex shape. This also applies in the case of displaying three-dimensionally.

According to the display device 201 according to the second example embodiment, when the first region 210 has a convex shape or a substantially convex shape, information can be displayed according to a display mode having a high visibility. This is because, in the first region 210 having a convex shape or a substantially convex shape, it is possible to display information on communication, for example, by using a straight line or a substantially straight line as the line 211, according to a display mode having a higher visibility.

In other words, since the first region 210 has a convex shape or a substantially convex shape, for example, as compared with cases in which identification information (or an identifier) as illustrated in FIG. 5 or the like is displayed in an order of address numbers in one direction, the total number of the lines 211 connecting a plurality of nodes is displayed to be smaller. More specifically, for example, considering cases where a line connecting nodes executing communication is displayed on the display unit illustrated in FIG. 5, a display state in which lines representing communication are complicated is displayed, and a node "10.56.53.1" and a node "10.56.53.10" are most distantly displayed. In particular, when communication is executed between these nodes, the line connecting the two nodes is the longest. On the other hand, according to the display mode exemplified in FIG. 18, a line connecting these nodes does not depend on the address number of a node and the line is not complicated, so it is easy for the user to identify. Therefore, since information on communication is briefly displayed, users can easily identify a plurality of nodes and the communication to be executed between them.

In cases in which the first region 210 has a circular shape, a substantially circular shape, an elliptical shape, a substantially elliptical shape, a polygonal shape, or a substantially polygonal shape, according to the display device 201 of the second example embodiment, information can be further displayed according to a display mode having a high visibility. This is because the shape of the first region 210 can be easily identified. In other words, since the first region 210 has the above-described shape, users can easily specify a portion where a node or the like is displayed.

As in the example shown in FIG. 19, the display unit 202 may further display the information on communication according to the superimposed manner, together with the display mode indicating the communication state. FIG. 19 is a view illustrating one example of displaying in accordance with a mode in which information on communication is superimposed, together with a display mode representing information on communication. For example, the display unit 202 displays information on communication, such as the amount of communication transmitted and received in the communication, in accordance with a display mode in which the information is overlapped to information representing the communication. In FIG. 19, the display unit 202 does not explicitly display the first region 210.

By displaying the information on the display unit 202, it is possible to display a lot of information according to a display mode with a high visibility. This is because users can intuitively understand information on communication intelligently by reading information displayed by a display mode using a pattern according to a line diagram in combination.

Third Example Embodiment

Next, a third example embodiment of the present invention based on the above-described second example embodiment will be described.

Hereinafter, description will be made focusing on characteristic features of the present example embodiment. The same reference numerals are given to the same configurations as those of the above-described second example embodiment, and redundant explanations will be omitted.

Figure 20:
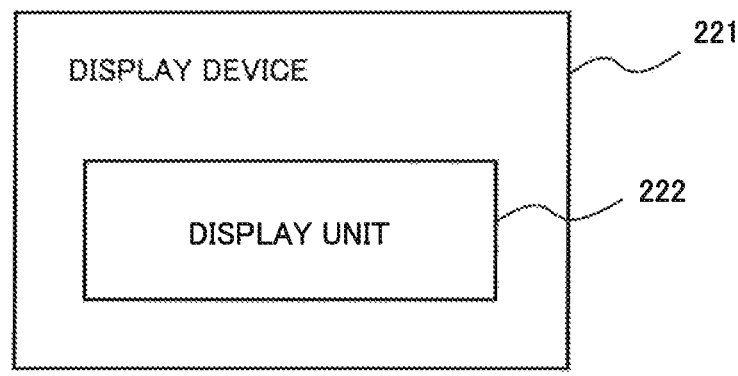
FIG. 20 is a block diagram illustrating a configuration of a display device according to a third example embodiment of the present invention.

The configuration of the display device 221 according to the third example embodiment and the processing executed by the display device 221 will be described with reference to FIG. 20. FIG. 20 is a block diagram illustrating a configuration of the display device 221 according to the third example embodiment of the present invention.

The display device 221 according to the third example embodiment includes a display unit 222.

As described with reference to FIG. 6 or the like, one piece of identification information (such as "10.56.53.1-2" or "10.56.53.5-6" and the like) may represent a plurality of communication bodies. The display unit 222 can display at least one of a node representing an identifier and a node representing identification information. In other words, the display unit 222 can display an identifier representing one communication body or identification information representing a plurality of communication bodies as one node. Further, the display unit 222 can represent, as nodes, a relationship (hereinafter, referred to as "comprehensive relationship") between certain identification information and an identifier (or identification information) represented comprehensively by certain identification information, in addition to information on communication executed between a plurality of nodes. This comprehensive relationship will be described. For example, it can also be considered that a node (or an identifier, referred to as "second node" for convenience of explanation) representing a certain communication body and a node (or identification information, referred to as "first node" for convenience of explanation) representing a plurality of communication bodies including the certain communication body have a comprehensive relationship among the plurality of communication bodies, based on whether or not the plurality of communication bodies represented by the identification information include the certain communication body representing the identifier. In this case, the display unit 222 can display the comprehensive relationship according to a display mode as will be described below with reference to FIG. 21.

Figure 21:
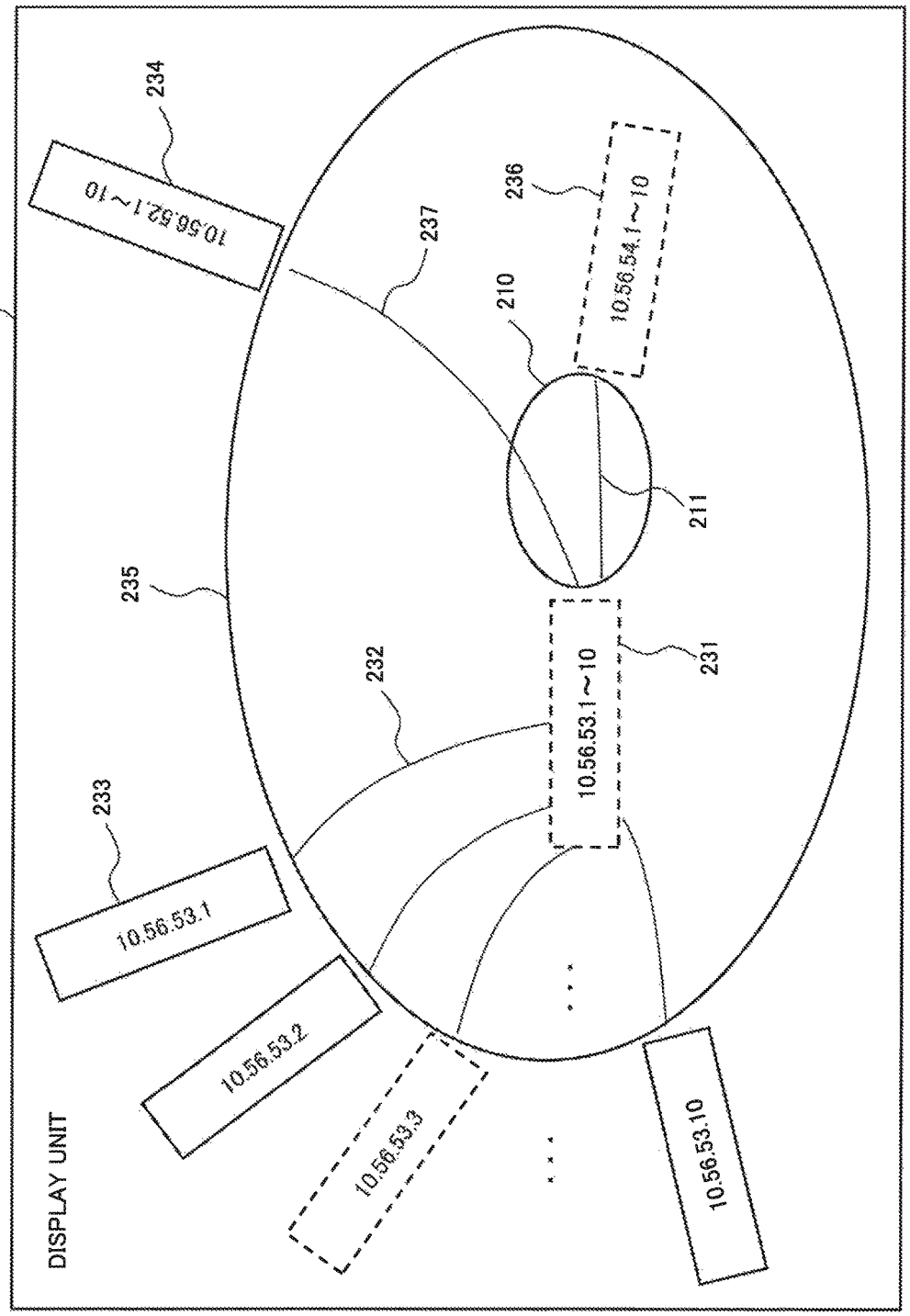
FIG. 21 is a diagram illustrating an example of an image displayed by a display device according to the third example embodiment.

In FIG. 21, identification information 231 is, for example, identification information "10.56.53.1 to 10". The identification information "10.56.53.1 to 10" represents addresses "10.56.53.1" to "10.56.53.10". FIG. 21 is a diagram illustrating an example of an image displayed by the display device 221 according to the third example embodiment. Therefore, the identification information 231 includes individual identifiers represented by addresses "10.56.53.1" to "10.56.53.10".

On the display screen illustrated in FIG. 21, for example, it can be considered that identification information "10.56.53.1-10" includes identification information including a part of addresses "10.56.53.1" to "10.56.53.10". For example, identification information "10.56.53.1-10" includes identification information such as identification information "10.56.53.1-2" or identification information "10.56.53.3-5". In other words, this display mode can be regarded as representing the comprehensive relationship between a plurality of nodes as described above.

The display unit 222 displays the second node around a region 235.

For example, the display unit 222 displays identification information "10.56.53.1" (or an identifier 233), identification information "10.56.53.2", or "10.56.53.10", or the like as the second node around the region 235. The display unit 222 further displays a first node having a comprehensive relationship with the second node displayed.

A comprehensive relationship between the first node and the second node will be described with reference to the example shown in FIG. 21. For example, referring to FIG. 21, the identification information 231 represents identification information "10.56.53.1 to 10". Identification information 233 represents identification information "10.56.53.1". Since "10.56.53.1-10" includes "10.56.53.1", it can be considered that the identification information 231 includes an identifier 233. Therefore, according to the above-described assumption about the first node and the second node, the first node is the identification information 231, and the second node is the identifier 233.

In FIG. 21, identification information 234 and identification information 236 may be either the first node or the second node. However, for convenience of explanation, it is assumed that the identification information 234 is the second node, and the identification information 236 is the first node.

The display unit 222 displays the second node, and at the same time, displays the first node around the first region 210, outside the first region 210, and inside the region 235. In other words, the region 235 includes the first region 210.

More specifically, in the example illustrated in FIG. 21, the display unit 222 displays an identifier 233 and the identification information 234 around the region 235. The display unit 222 displays the identification information 231 and the identification information 236 around the first region 210.

The display unit 222 may not necessarily explicitly display the first region 210 and the region 235.

The shape of the region 235 will be described. The region 235 has a shape such as a circular shape, a substantially circular shape, an elliptical shape, a substantially elliptic shape, a polygonal shape, a substantially polygonal shape, a convex shape, or a substantially convex shape. When the display unit 222 displays three-dimensionally, the region 235 may have a three-dimensional shape such as a spherical shape, a substantially spherical shape, a polyhedral shape, a substantially polyhedral shape, an ellipsoid shape, a substantially ellipsoidal shape, a curved body shape having a convex shape, or a curved body shape having a substantially convex shape. Users can easily and intuitively understand information on communication by reading displayed information.

When the first node and the second node have a comprehensive relationship, the display unit 222 displays the node according to the above-described mode, and also displays the comprehensive relationship inside the region 235 and outside the first region 210 as a line 232 connecting the first node and the second node.

The line 232 does not have to be connected to the node, and may be displayed up to the vicinity of the node to the extent that users can identify the line. The line 232 need not be a curve, and may be a straight line. Users can easily and intuitively understand information on communication by reading displayed information.

In the example illustrated in FIG. 21, the identification information 231 represents the identifier 233. Therefore, the display unit 222 displays the line 232, which connects the identification information 231 and the identifier 233, inside the region 235 and outside the first region 210.

When communication is executed between a node displayed around the region 235 and a node displayed around the first region 210, the display unit 222 may display a line indicating the communication in the region 235. For example, in the example illustrated in FIG. 21, the display unit 222 may display a line 237 connecting the identification information 231 and the identification information 234. In other words, this means that communication is executed between the identification information 231 and the identification information 234.

Further, the display device 221 may display a node around a region that includes the region 235 and the region whose periphery does not cross a periphery of the region 235 in a similar manner to the display mode described above. That is, the region 235 represents a region in which identification information, information on communication executed between nodes, or comprehensive relationship between a plurality of nodes can be displayed.

Next, effects of the display unit 222 according to the third example embodiment will be described.

According to the display device 221 according to the present example embodiment, it is possible to display more information in accordance with a display mode having a higher visibility than the display device 201 according to the second example embodiment. This is because, when there is a comprehensive relationship between a plurality of nodes, the display device 221 displays the comprehensive relationship.

In other words, when there is a comprehensive relationship between a plurality of nodes, the display device 221 further displays the comprehensive relationship in addition to communication. Since the display unit 222 separately displays the comprehensive relationship and information on communication, users can easily specify what comprehensive relationship nodes are in or what kind of communication is executed among a plurality of nodes.

Fourth Example Embodiment

Next, a fourth example embodiment of the present invention based on the above-described example embodiment will be described.

Hereinafter, description will be made focusing on characteristic features of the present example embodiment. The same reference numerals are given to the same configurations as those of the above-described example embodiment, and redundant explanations will be omitted. In the present example embodiment, for convenience of explanation, the processing and the like according to the present example embodiment will be described focusing on a level (or change in the level), descriptions concerning a line (such as a line 211 (FIG. 18) and line 232 (FIG. 21)) representing information on communication and information on communication (FIG. 19) are omitted.

Figure 22:
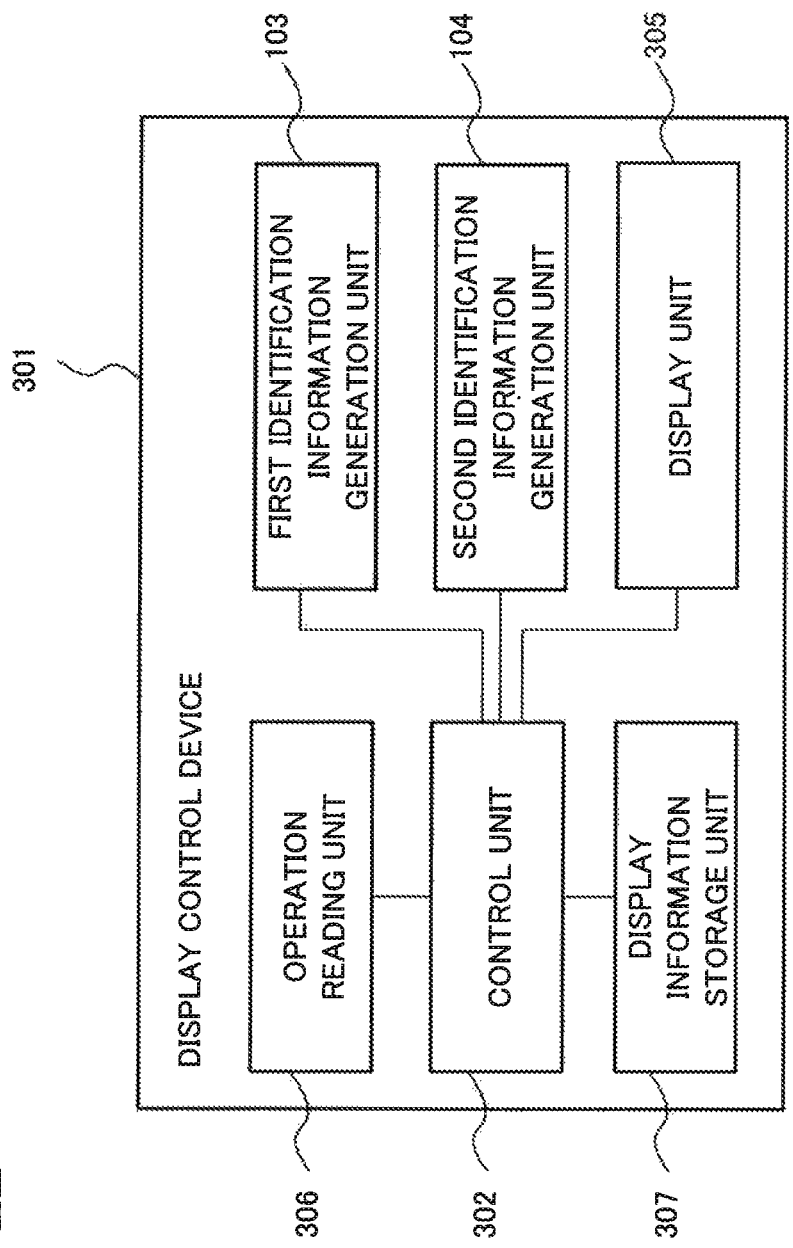
FIG. 22 is a block diagram illustrating the configuration of a display control device according to a fourth example embodiment of the present invention.
Figure 23:
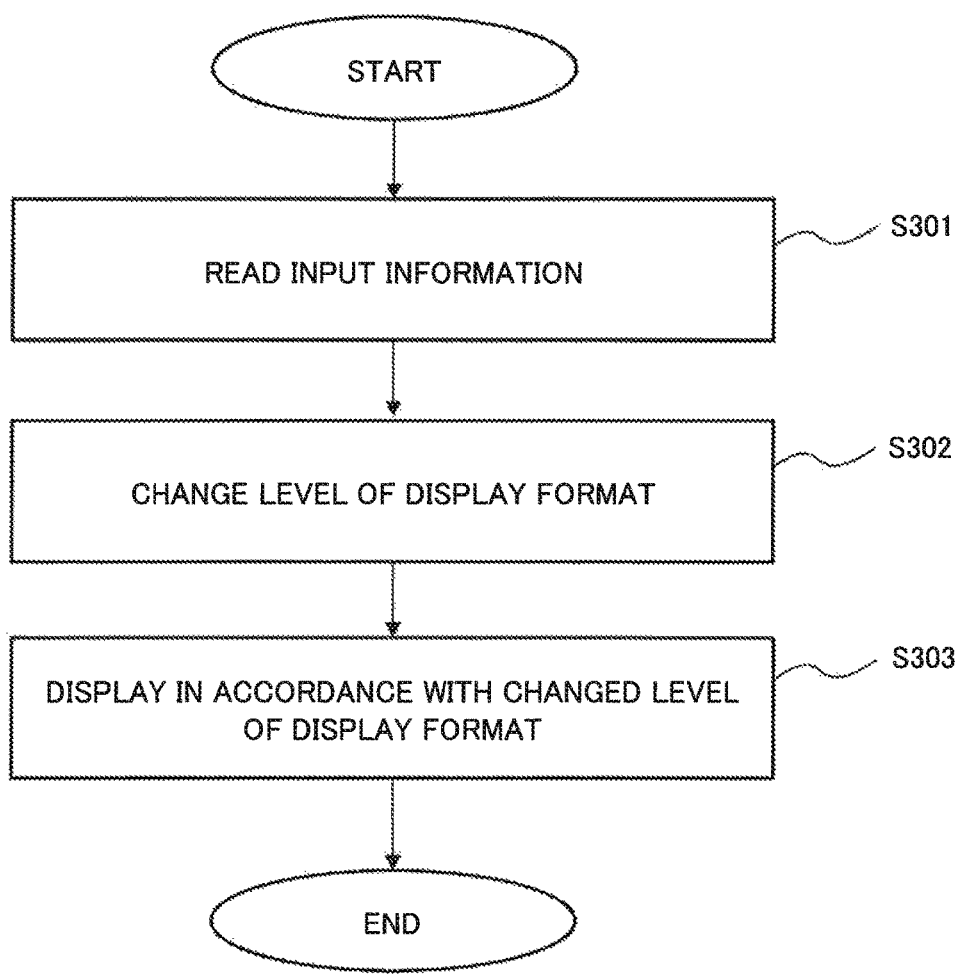
FIG. 23 is a flowchart illustrating the flow of processing in the display control device according to the fourth example embodiment.

A configuration of the display control device 301 according to the fourth example embodiment and processing executed by the display control device 301 will be described with reference to FIGS. 22 and 23. FIG. 22 is a block diagram illustrating the configuration of the display control device 301 according to the fourth example embodiment of the present invention. FIG. 23 is a flowchart illustrating the flow of processing in the display control device 301 according to the fourth example embodiment.

The display control device 301 according to the fourth example embodiment includes a control unit 302, a first identification information generation unit 103, a second identification information generation unit 104, a display unit 305, an operation reading unit 306, and a display information storage unit 307.

The display unit 305 executes a similar processing to the processing in any of the display unit 105 according to the first example embodiment, the display device 201 according to the second example embodiment, and the display device 221 according to the third example embodiment.

Figure 24:
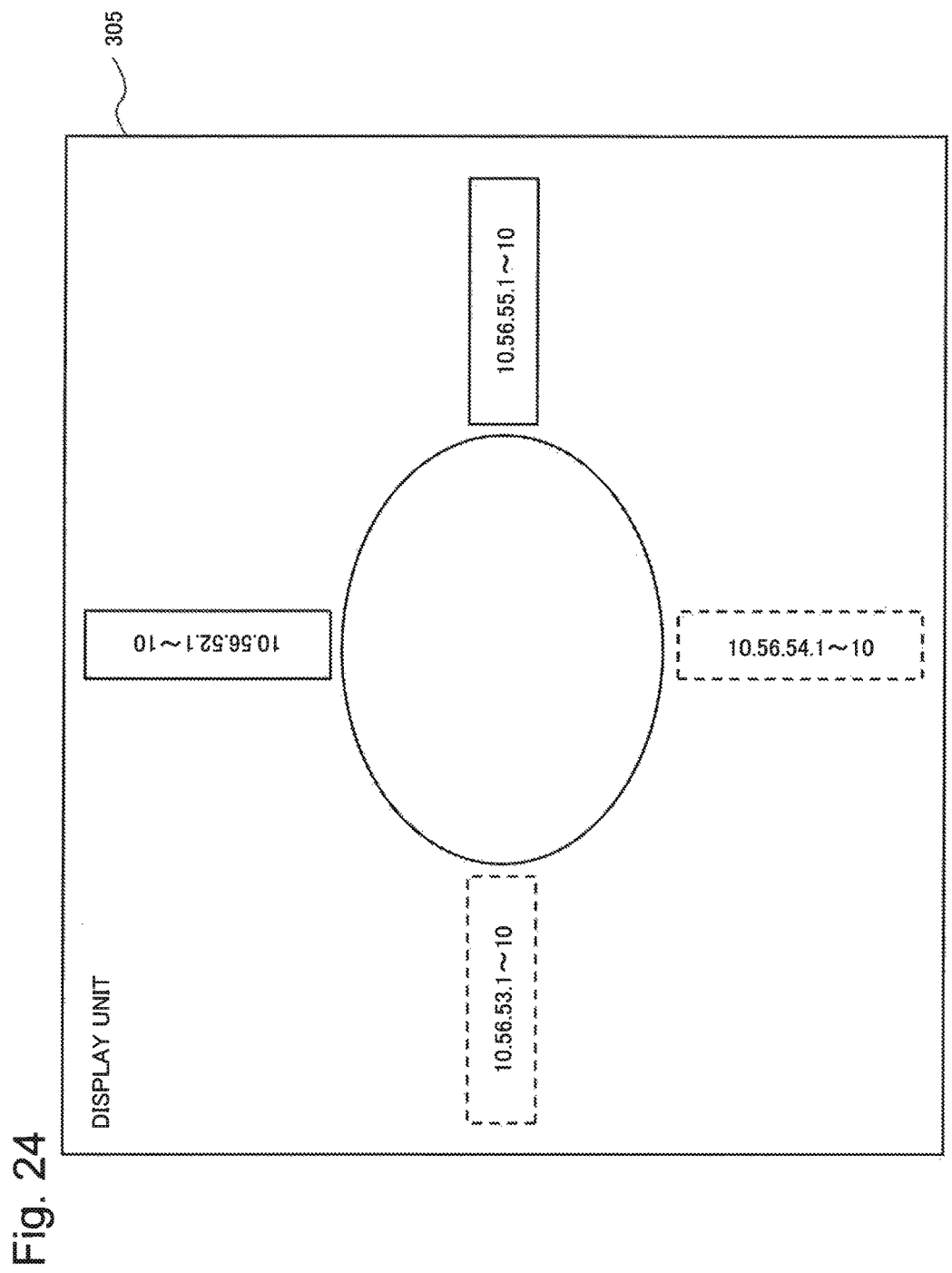
FIG. 24 is a diagram illustrating an example of information displayed on a display unit.

For convenience of explanation, it is assumed that the display unit 305 executes a similar processing to the processing of the display device 201 according to the second example embodiment. Further, as illustrated in FIG. 24, it is assumed that the display control device 301 displays information on communication bodies (not illustrated) on the display unit 305 in accordance with a level 5 display format. FIG. 24 is a diagram illustrating an example of information displayed on the display unit 305. Further, it is assumed that the display control device 301 displays a plurality of communication bodies included in an information system and communication executed between the communication bodies.

It is assumed that display information, in which the position and size of a certain region and the level of the display format displayed in the certain region are associated with each other, is stored in the display information storage unit 307. In other words, in the example illustrated in FIG. 24, information, in which a region displaying an image and a level 5 display format are associated with each other, is stored in the display information storage unit 307.

The display control device 301 displays information on communication bodies on the display unit 305 according to a level 5 display format. Therefore, for example, an administrator who manages an information processing system can specify a group having a communication body (hereinafter, referred to as "abnormal communication body") associated with a state "abnormal" by referring to identification information or the like displayed on the display unit 305. However, when following the level 5 display format, the display control device 301 does not display an identifier (address) specifying each communication body.

For example, the administrator specifies an abnormal communication body by changing the level of the display format. The processing in this case will be described.

For example, when an administrator refers to individual communication bodies represented by certain identification information, the identification information is specified by clicking the identification information with a mouse, and the level of the display format for displaying the identification information is input. Alternatively, the administrator changes the level of the display format for displaying the identification information by moving a mouse pointer on the identification information and rotating the scroll wheel of the mouse.

The operation reading unit 306 reads the input identification information and the level as input information (step S301), and transmits the read input information to the control unit 302.

The control unit 302 receives the input information, changes the level of the display format for displaying the information according to the received input information (step S302), and displays information according to the display format of the changed level (step S303).

In step S302, the control unit 302 instructs the first identification information generation unit 103 or the second identification information generation unit 104 to process according to the display format of the changed level, generates the generated identification information, and displays information including the identification information on the display unit 305.

For example, in cases in which an administrator inputs level 1, when the size of the calculated region is equal to or smaller than a predetermined size, the display control device 301 displays not the identification information but an identifier (address) capable of identifying individual communication bodies represented by the identification information.

Here, for convenience of explanation, it is assumed that the display unit 305 has a detail display unit and an aggregate display unit, both of which are not illustrated. It is assumed that the detail display unit displays information according to a display format having a relatively low level among regions on the display unit 305. For example, the detail display unit displays identifiers representing individual communication bodies. Further, it is assumed that the aggregate display unit displays information according to a display format having a relatively high level among regions on the display unit 305. For example, the aggregate display unit displays identification information.

The detail display unit and the aggregate display unit conceptually represent, for example, a partial region of the display unit 305. Further, the display unit 305 may have a detail display unit or an aggregate display unit in any region on the display unit 305. In other words, the detail display unit represents a region displaying identifiers representing individual communication bodies, and the aggregate display unit represents a region displaying identification information.

Figure 25:
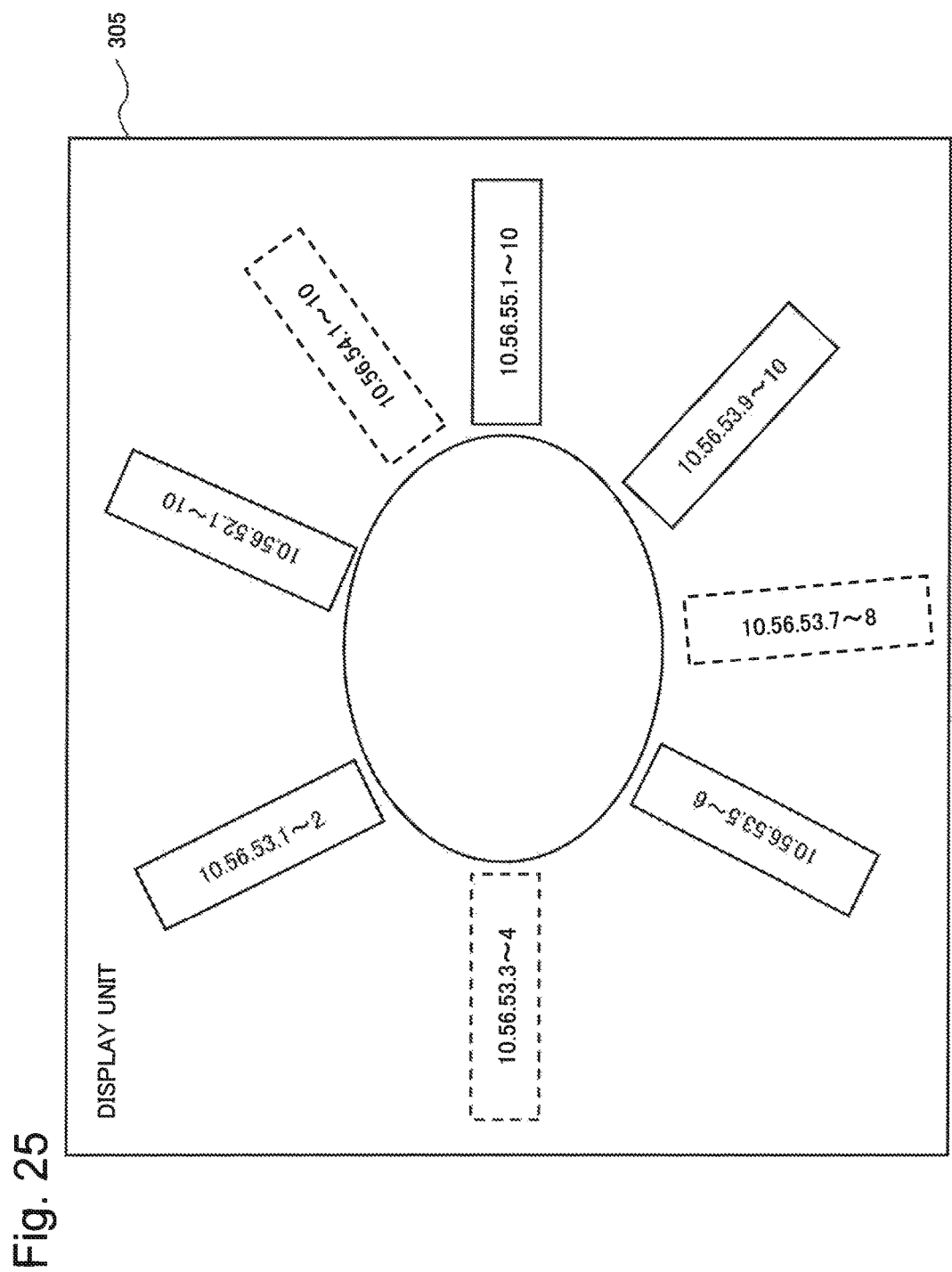
FIG. 25 is a diagram illustrating an example of information displayed by a display unit.
Figure 26:
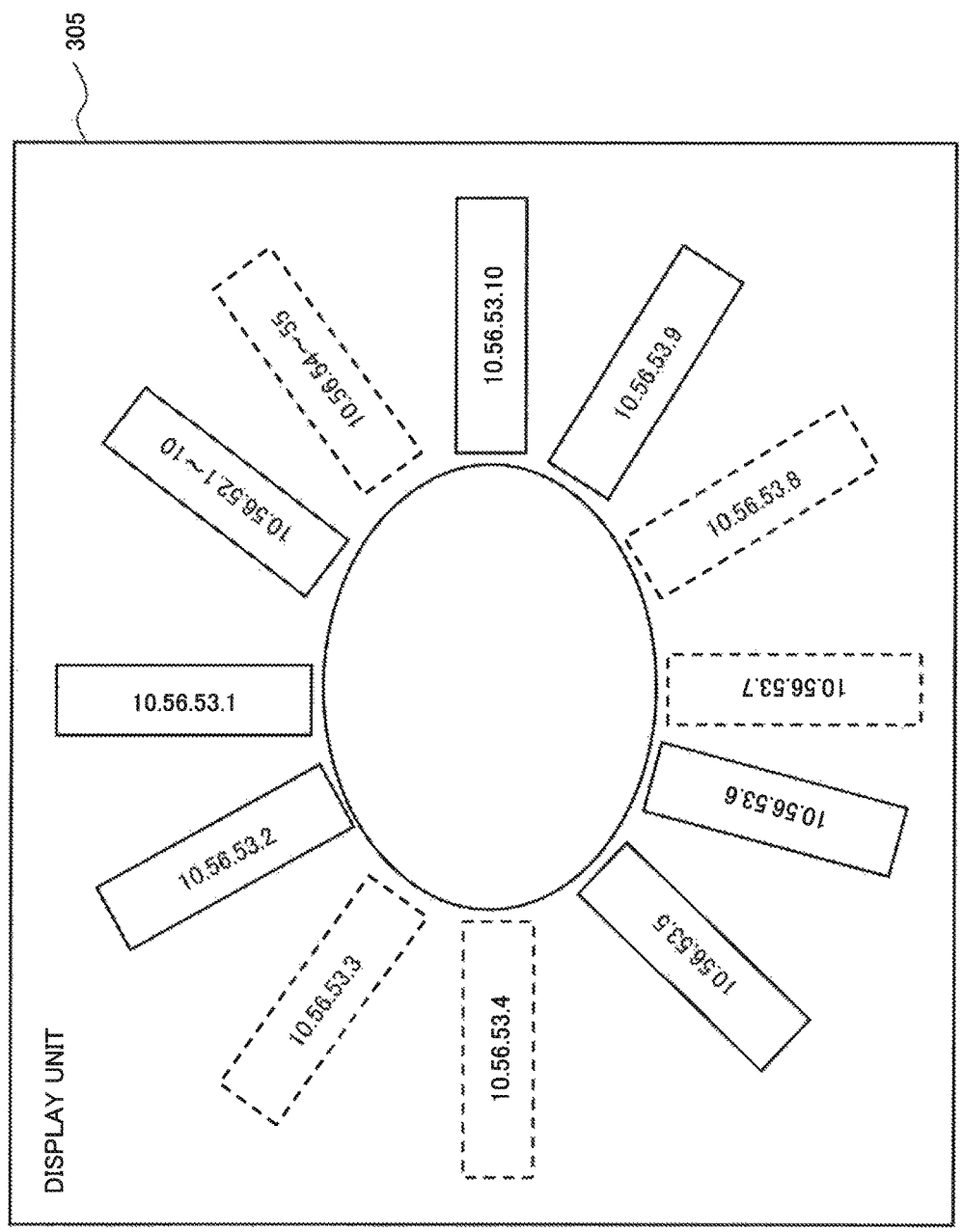
FIG. 26 is a diagram illustrating an example of information displayed by a display unit.

In this case, the display unit 305 may display the information illustrated in FIG. 25 or FIG. 26. FIG. 25 and FIG. 26 are diagrams illustrating an example of information displayed by the display unit 305. In the example illustrated in FIG. 25, the display unit 305 displays some information according to the level 3 display format, and displays a part of information different from the some information according to the level 5 display format. In other words, in this case, the detail display unit displays the some information according to the level 3 display format. Further, the aggregate display unit displays the part of information different from the some information according to the level 5 display format. In the example illustrated in FIG. 26, the display unit 305 displays information according to the display formats of level 1 and level 6.

For example, it is assumed that an administrator referring to the information illustrated in FIG. 24 change the level (or level 5) of the display format displaying the identification information "10.56.53.1-10" to level 3.

In this case, the operation reading unit 306 reads the input identification information and the level as input information, and transmits the read input information to the control unit 302. The control unit 302 receives the input information and changes the level of the display format according to the received input information (step S302). Instead of displaying the identification information designated by the input information, the control unit 302 displays the information exemplified in FIG. 25 according to the display format of the changed level (step S303).

As a result, the control unit 302 displays identification information representing communication bodies, such as identification information "10.56.53.1-2" or identification information "10.56.53.3-4", that represents a smaller number of communication bodies in place of identification information "10.56.53.1-10" on the display unit 305.

For example, it is assumed that an administrator referring to the information exemplified in FIG. 24 changes the level (or level 5) of the display format displaying identification information "10.56.53.1-10" to level 1.

At this time, the control unit 302 executes similar processing to the processing illustrated in FIG. 23. In other words, the control unit 302 displays identifiers (addresses) as illustrated in FIG. 26 according to a level 1 display format. Therefore, in accordance with the display control device 301 according to the present example embodiment, an administrator can specify an abnormal communication body by reading information such as an identifier to be displayed.

When displaying information according to the display format of the changed level, the control unit 302 may calculate the size of the region needed to display the information and then perform a similar processing to the processing illustrated in the first example embodiment. In other words, when the size of the calculated region is larger than a predetermined size, the control unit 302 may calculate the level of the display format with respect to information (an identifier, identification information) different from the designated identification information, among information displayed on the display unit 305. Here, for convenience of explanation, a region for displaying information on designated identification information is referred to as a "first region", and a region for displaying information (an identifier, identification information) different from the identification information is referred to as a "second region".

In other words, regarding information to be displayed in the second region, the first identification information generation unit 103 and the second identification information generation unit 104 generate identification information. Next, the control unit 302 selects specific identification information on the basis of the size of the second region, and displays the selected specific identification information on the display unit 305.

For example, it is assumed that the control unit 302 selects identification information generated according to a level 6 display format with respect to the second region. In other words, in this case, in the example illustrated in FIG. 26, the control unit 302 displays the information displayed according to a level 5 display format in the second region in accordance with a level 6 display format. In other words, in this example, in response to changing the level of the display format displayed in the first region, the control unit 302 changes the level of the display format displayed in the second region.

The display control device 301 may perform the following processing in response to the user changing the level of the display format in which the identification information (or the identifier) is displayed by the user such as the administrator. In other words, the processing is processing for changing, so as to be adapted a predetermined size, the level of the display format for displaying identification information (or identifier) displayed besides identification information (or identifier) whose display format level has been changed.

Therefore, the display control device 301 can adjust the granularity for displaying information based on a predetermined size. In this case, for example, the display control device 301 may display identification information representing communication bodies possessed by more organizations with respect to information different from identification information designated by users. As a result, the visibility of information displayed by the display control device 301 according to the present example embodiment is improved.

The display control device 301 may repeat processing of changing the display format in accordance with a predetermined size.

Next, effects of the display control device 301 according to the fourth example embodiment will be described.

According to the display control device 301 according to the present example embodiment, information can be displayed in accordance with a display mode having a higher visibility. The reason is Reason 1 and Reason 2.

(Reason 1) The configuration of the display control device 301 according to the fourth example embodiment includes the configuration of the display control device or the display device according to the above-described example embodiment; and (Reason 2) In response to receiving input information, the control unit 302 displays communication bodies included in displayed identification information.

The reason why the display control device 301 achieves a high visibility will be described in more detail. The control unit 302 can determine a level representing the degree of detail of displaying communication bodies in, for example, the second region according to a predetermined size. For example, it is assumed that an administrator has changed the level of the display format for displaying "10.56.53.1-10", which is focused identification information among identification information displayed at a level 5 display format as illustrated in FIG. 24, to 3. In this case, the control unit 302 displays identification information "10.56.53.1-10" according to a display mode represented by a level 3 display format, as illustrated in FIG. 25, according to setting change. In other words, by referring to the display unit 305, an administrator can change only the level of the display format relating to identification information included in the focused identification information "10.56.53.1-10". In other words, in accordance with the display control device 301 according to the present example embodiment, since the level of the display format to be displayed for each identification information can be set, information can be displayed according to a display mode having a higher visibility.

Similarly, for example, it is assumed that an administrator has changed the level of the display format for displaying "10.56.53.1-10", which is focused identification information, among identification information displayed at a level 5 display format as illustrated in FIG. 24 to 1. In this case, the control unit 302 displays identification information "10.56.53.1-10" according to the display mode represented by a level 1 display format, as illustrated in FIG. 26, according to setting change. Further, the control unit 302 displays a summary by, for example, executing a process of increasing the level of the display format with respect to identification information different from the focused identification information. In other words, by referring to the display unit 305, an administrator can visually recognize a display format relating to identification information included in the focused identification information "10.56.53.1-10". Further, when the display control device 301 increases the level of the display format relating to the identification information not focused, the identification information displayed on the display unit 305 decreases, and therefore, an administrator can more easily identify identification information of interest.

Therefore, in this case, according to the display control device 301 according to the present example embodiment, it is possible to display information according to a display mode having a higher visibility.

Fifth Example Embodiment

Next, a fifth example embodiment of the present invention based on the above-described fourth example embodiment will be described.

Hereinafter, description will be made focusing on characteristic features of the present example embodiment. The same reference numerals are given to the same configurations as those of the above-described fourth example embodiment, and redundant explanations will be omitted.

Figure 27:
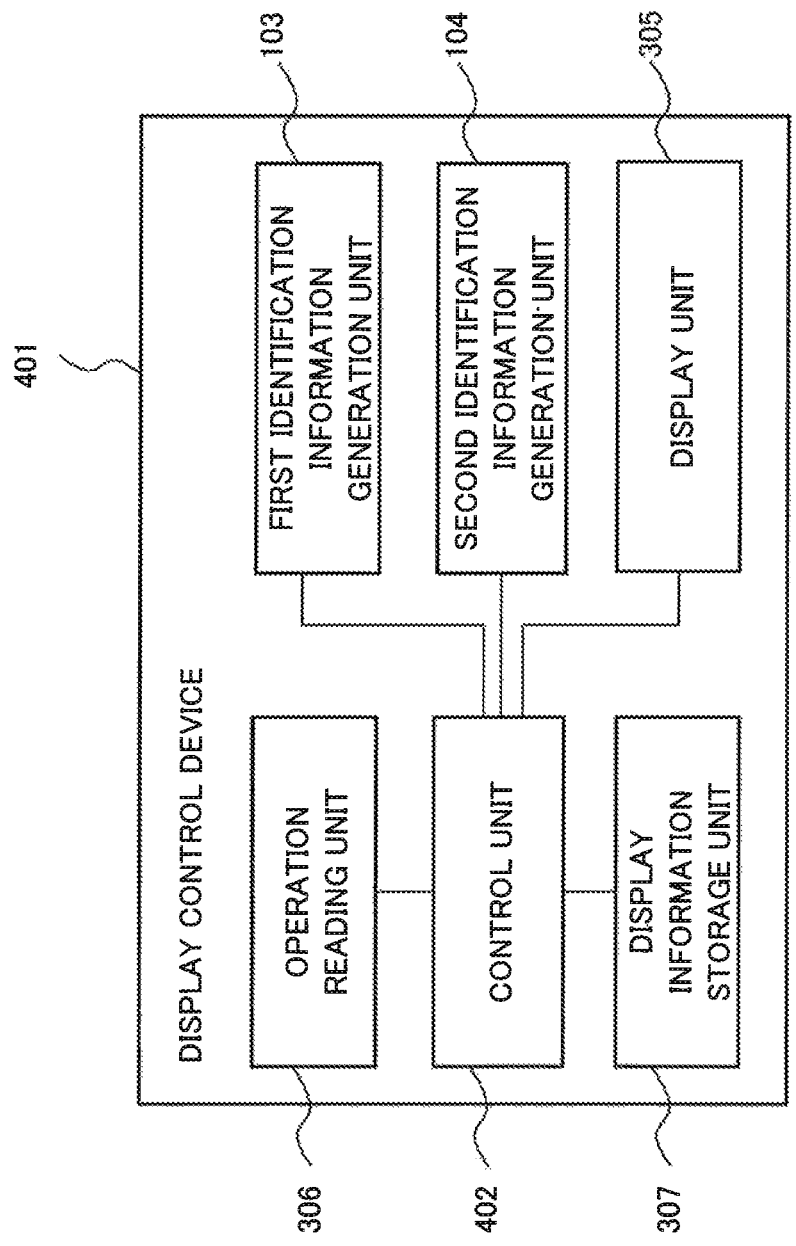
FIG. 27 is a block diagram illustrating a configuration of a display control device according to a fifth example embodiment of the present invention.
Figure 28:
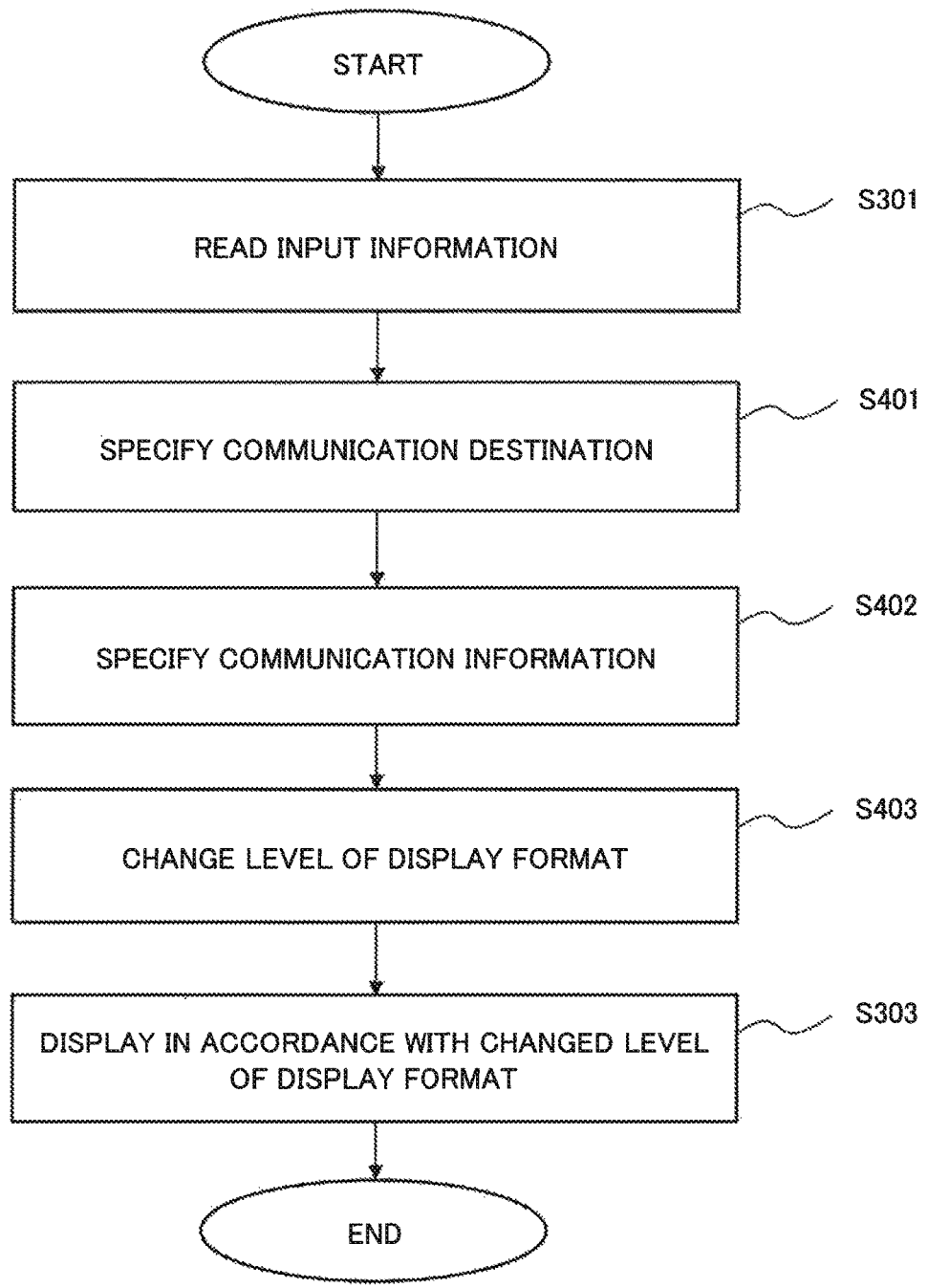
FIG. 28 is a flowchart illustrating the flow of processing in the display control device according to the fifth example embodiment.

With reference to FIGS. 27 and 28, the configuration of the display control device 401 according to the fifth example embodiment and the processing executed by the display control device 401 will be described. FIG. 27 is a block diagram illustrating a configuration of the display control device 401 according to the fifth example embodiment of the present invention. FIG. 28 is a flowchart illustrating the flow of processing in the display control device 401 according to the fifth example embodiment.

The display control device 401 according to the fifth example embodiment includes a control unit 402, a first identification information generation unit 103, a second identification information generation unit 104, a display unit 305, an operation reading unit 306, and a display information storage unit 307.

The operation reading unit 306 reads the input information (step S301), and transmits the read input information to the control unit 402.

Next, the control unit 402 receives the input information. The control unit 402 specifies an identifier associated with a communication body which is a communication destination of a communication body represented by identification information included in the input information (step S401). For example, by referring to communication information in which an identifier and an identifier of a communication body communicating with a communication body represented by the identifier are associated with each other, the control unit 402 specifies an identifier representing a communication body which is a communication destination. Next, the control unit 402 specifies communication information including the specified identifier (step S402).

Next, the control unit 402 changes the level of the display format with respect to identification information included in the input information and the specified identification information (step S403). In step S403, processing similar to the processing illustrated in step S302 is executed.

Figure 29:
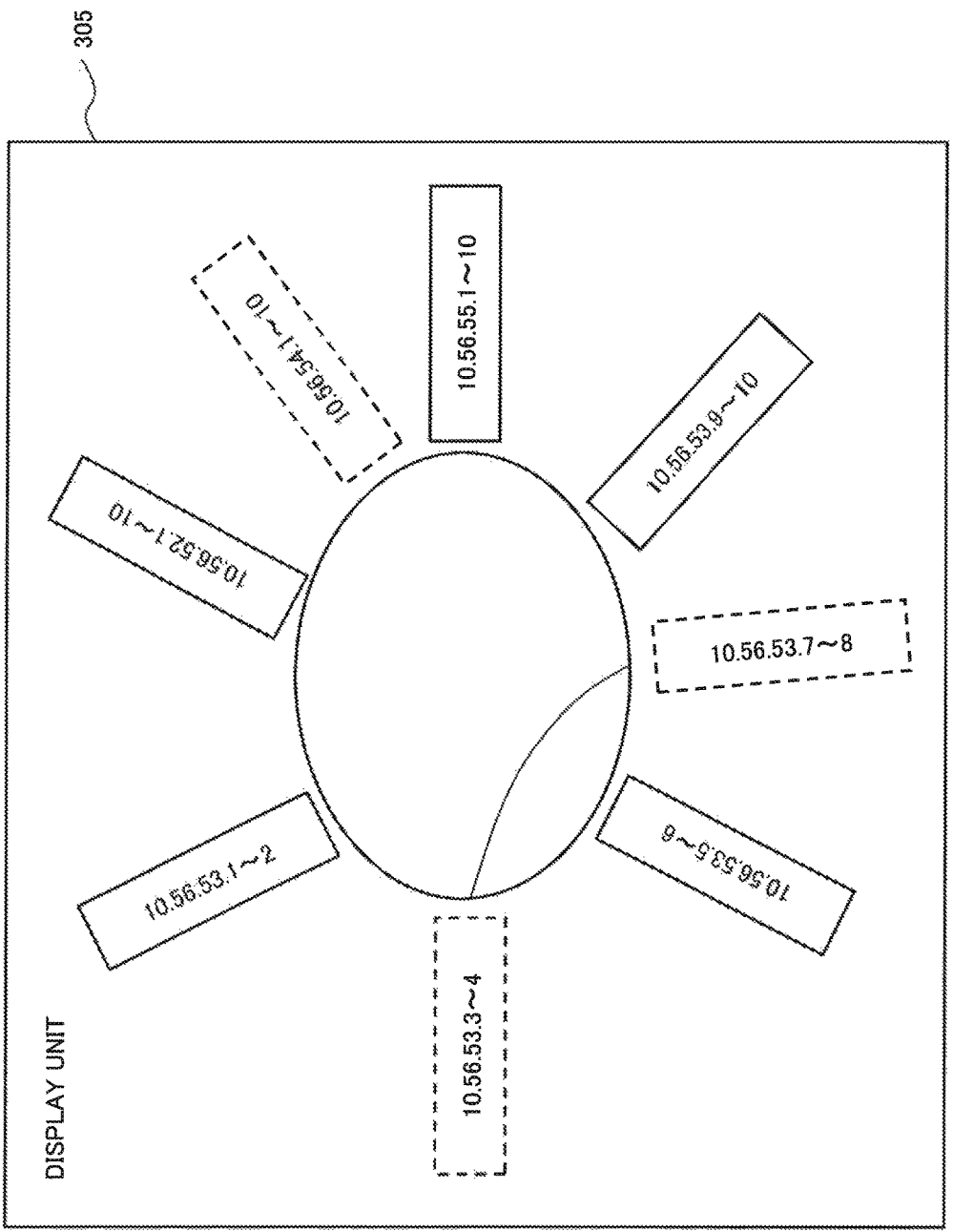
FIG. 29 is a diagram illustrating one example of information displayed by a display unit.

For example, it is assumed that the control unit 402 displays one example illustrated in FIG. 29. FIG. 29 is a diagram illustrating one example of information displayed by the display unit 305. An administrator sets level 1 in input information with respect to the display format for displaying identification information "10.56.53.3-4". In the example illustrated in FIG. 29, the identification information is displayed according to a level 2 display format. The identification information "10.56.53.7-8" is also displayed according to a level 2 display format.

Based on communication information, the control unit 402 specifies communication bodies (10.56.53.7 and 10.56.53.8) communicating with communication bodies represented by identification information "10.56.53.3-4". Next, the control unit 402 specifies identification information "10.56.53.7-8" representing the two communication bodies.

Figure 30:
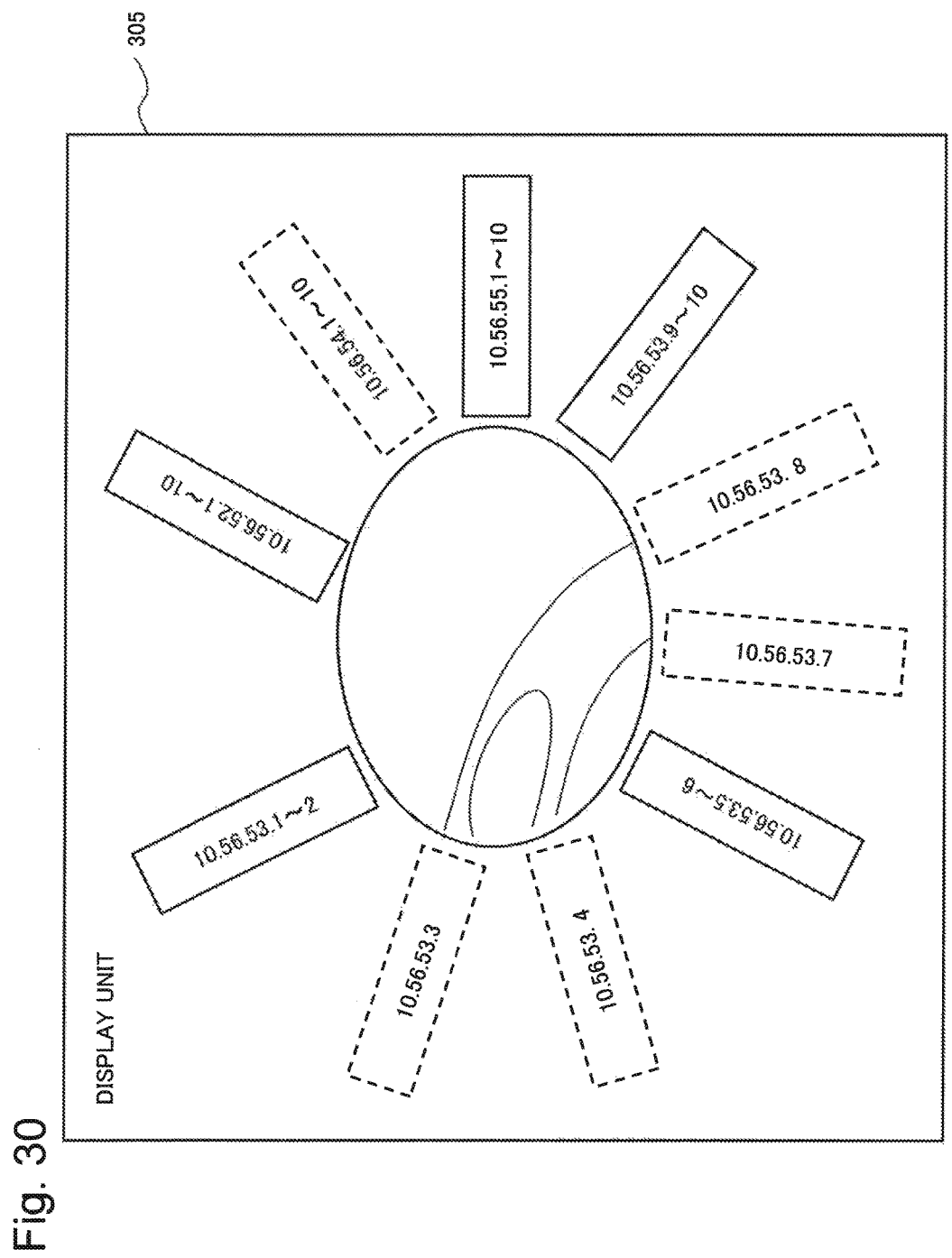
FIG. 30 is a diagram illustrating an example of information displayed by a display unit.

Next, the control unit 402 sets a display format for displaying identification information "10.56.53.3-4" and identification information "10.56.53.7-8" to level 1 (that is, the level designated by the input information). In other words, the control unit 402 displays identification information "10.56.53.3-4", and identification information "10.56.53.7-8" as illustrated in FIG. 30 according to a level 1 display format. FIG. 30 is a diagram illustrating an example of information displayed by the display unit 305.

The control unit 402 may execute processing relating to the second region similarly to the processing illustrated in the fourth example embodiment.

Next, effects of the display control device 401 according to the fifth example embodiment will be described.

In accordance with the display control device 401 according to the present example embodiment, more information can be displayed in accordance with the display mode with a high visibility. The reason is Reason 1 and Reason 2.

(Reason 1) The configuration of the display control device 401 according to the fifth example embodiment includes the configuration of the display control device 301 according to the fourth example embodiment or the display device described in each example embodiment of the present invention, and (Reason 2) The display control device 401 also displays a communication destination in accordance with a display format of a designated level.

In other words, in response to reading input information, the control unit 402 also displays identification information including a communication body which is a communication destination of the communication body included in the displayed identification information in accordance with a display format of a level designated by the input information. In other words, for example, the display control device 401 also displays on the display unit 305 the communication body communicating with the communication body which is a target of interest.

(Hardware Configuration Example)

A configuration example of hardware resources that realize a display control device or a display devices in the above-described example embodiments of the present invention using a single calculation processing apparatus (an information processing apparatus or a computer) will be described. However, the display control device or a display device may be realized using physically or functionally at least two calculation processing apparatuses. Further, the control device or the display device may be realized as a dedicated apparatus.

Figure 31:
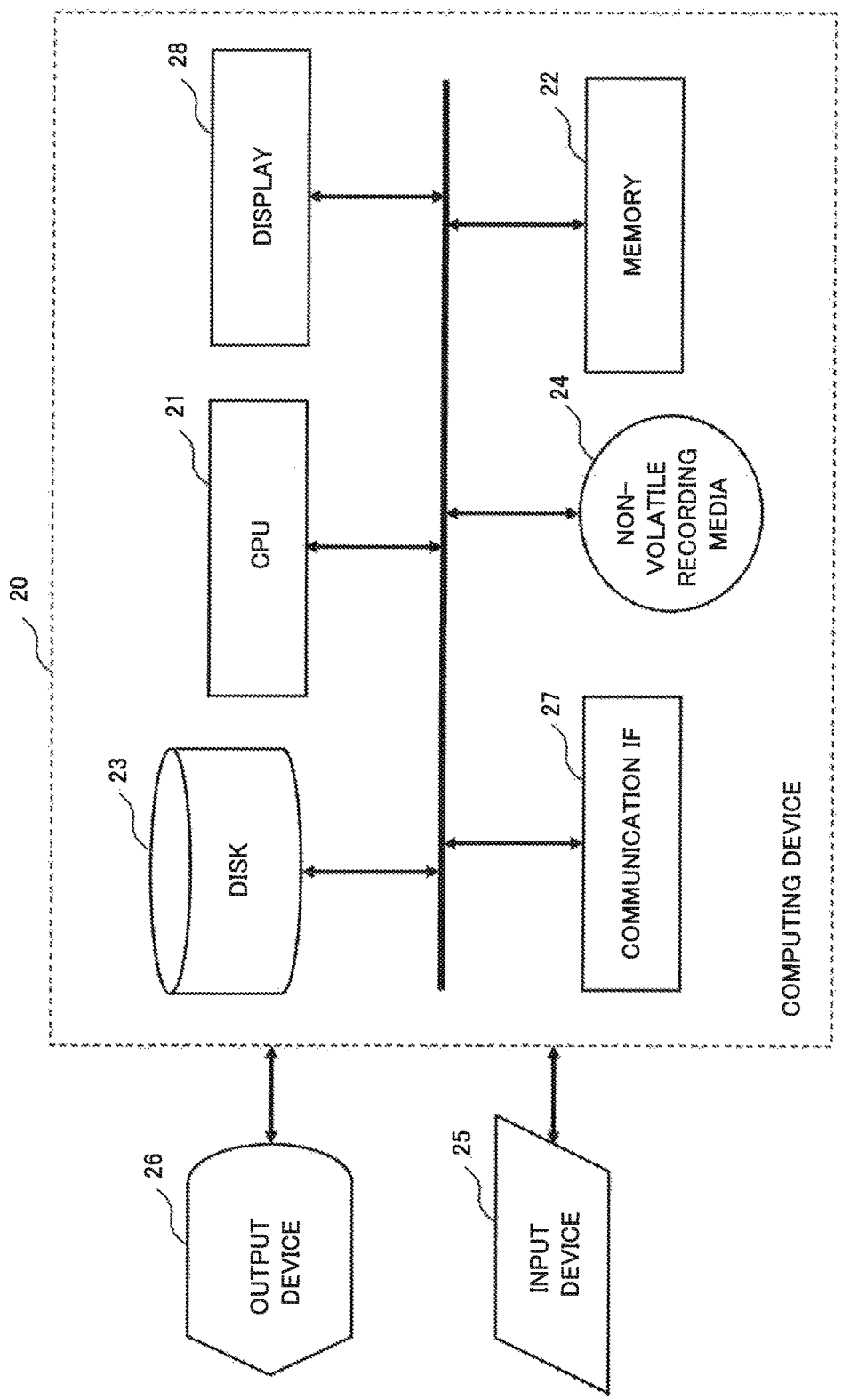
FIG. 31 is a block diagram schematically illustrating a hardware configuration of a calculation processing apparatus capable of realizing a display control device according to each example embodiment of the present invention.

FIG. 31 is a block diagram schematically illustrating a hardware configuration of a calculation processing apparatus capable of realizing the display control device according to first, fourth, or fifth example embodiments or the display device according to second or third example embodiments. A calculation processing apparatus 20 includes a central processing unit (CPU) 21, a memory 22, a disc 23, a non-transitory recording medium 24, a communication interface (hereinafter, expressed as a "communication I/F") 27 and a display 28. A calculation processing apparatus 20 further may connect an input apparatus 25 and an output apparatus 26. The calculation processing apparatus 20 can execute transmission/reception of information to/from another calculation processing apparatus and a communication apparatus via the communication I/F 27.

The non-volatile recording medium 24 is, for example, a computer-readable Compact Disc, Digital Versatile Disc, Universal Serial Bus (USB) memory, the non-volatile recording medium 24 may be Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory medium 24.

In other words, the CPU 21 copies, on the memory 22, a software program (a computer program: hereinafter, referred to simply as a "program") stored by the disc 23 when executing the program and executes arithmetic processing. The CPU 21 reads data necessary for program execution from the memory 22. When display is needed, the CPU 21 displays an output result on the output apparatus 26 or the display 28. When a program is input from the outside, the CPU 21 reads the program from the input apparatus 25. The CPU 21 interprets and executes an display control program present on the memory 22 corresponding to a function (processing) indicated by each unit illustrated in FIG. 1, FIG. 14, FIG. 17, FIG. 20, FIG. 22, or FIG. 27 described above or an display control program (FIG. 2, FIG. 13, FIG. 15, FIG. 23, or FIG. 28). The CPU 21 sequentially executes the processing described in each example embodiment of the present invention.

In other words, in such a case, it is conceivable that the present invention can also be made using the display control program. Further, it is conceivable that the present invention can also be made using a computer-readable, non-transitory recording medium storing the display control program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2014-183807, filed on Sep. 10, 2014, the disclosure of which is incorporated herein in its entirety.

REFERENCE SIGNS LIST

101 Display control device
102 Control unit
103 First identification information generation unit
104 Second identification information generation unit
105 Display unit
501 Communication bodies
502 Agent
503 Abnormality detection device
201 Display device
202 Display unit
210 First region
211 Line
212 Identifier
213 Identification information
214 Identification information
221 Display device
222 Display unit
231 Identification information
232 Line
233 Identifier
234 Identification information
235 Region
236 Identification information
237 Line
301 Display control device
302 Control unit
305 Display unit
306 Operation reading unit
307 Display information storage unit
401 Display control device
402 Control unit
20 Computing device
21 CPU
22 Memory
23 Disk
24 Non-volatile recording media
25 Input device
26 Output device
27 Communication IF
28 Display

What is claimed is:

1. A display device configured to display a first node representing a communication body capable of communicating or a second node representing a plurality of communication bodies around the first region and,
   display communication executed either between the first node and the second node, between the plurality of first nodes, or between the plurality of second nodes inside the first region with a display mode connecting the plurality of nodes, wherein
   in cases that information is represented by a third node further has an inclusion relationship representing information represented by a fourth node, the display device is to display the fourth node around a region which encompasses the first region and which has surroundings that do not overlap with one another other, display the third node around the first region, and display the inclusion relationship inside the region and outside the first region with a display mode connecting the third node and the fourth node.

2. The display device according to claim 1, wherein the first region has a convex shape or a substantially convex shape.

3. The display device according to claim 1, wherein the first region is a circular shape, a substantially circular shape, an elliptical shape, a substantially elliptical shape, a polygonal shape, or a substantially polygonal shape.

4. The display device according to claim 1, wherein displays information on the communication in accordance with a mode superimposed with a display mode representing the communication.

5. The display device according to claim 1, wherein displays a line representing the communication, and displays information on the communication in accordance with a mode superimposed on the displayed line.

6. The display device according to claim 1, wherein the communication bodies are either communication devices, files, processes, sockets, or pipes.

7. A display method comprising:
   displaying a first node representing a communication body capable of communicating or a second node representing a plurality of communication bodies around the first region;
   displaying communication executed either between the first node and the second node, between the plurality of first nodes, or between the plurality of second nodes inside the first region with a display mode connecting the plurality of nodes; and
   in cases that information is represented by a third node further has an inclusion relationship representing information represented by a fourth node, displaying the fourth node around a region which encompasses the first region and which has surroundings that do not overlap with one another other, displaying the third node around the first region, and displaying the inclusion relationship inside the region and outside the first region with a display mode connecting the third node and the fourth node.

8. A non-transitory recording medium storing a display program recorded therein, the program making a computer achieve:
   a display function configured to display a first node representing a communication body capable of communicating or a second node representing a plurality of communication bodies around the first region and,
   display communication executed either between the first node and the second node, between the plurality of first nodes, or between the plurality of second nodes inside the first region with a display mode connecting the plurality of nodes, wherein
   in cases that information is represented by a third node further has an inclusion relationship representing information represented by a fourth node, the computer is to display the fourth node around a region which encompasses the first region and which has surroundings that do not overlap with one another other, display the third node around the first region, and display the inclusion relationship inside the region and outside the first region with a display mode connecting the third node and the fourth node.

9. The non-transitory recording medium storing the display program according to claim 8 recorded therein, wherein, the first region has a convex shape or a substantially convex shape.

* * * * *